US012571632B2

(12) United States Patent
Sanchez Ruelas et al.

(10) Patent No.: US 12,571,632 B2
(45) Date of Patent: Mar. 10, 2026

(54) TARGET AND PLUMBING SYSTEM FOR TRANSFERRING A POINT OF INTEREST ON A JOBSITE SURFACE

(71) Applicant: Hilti Aktiengesellschaft, Schaan (LI)

(72) Inventors: Jafet German Sanchez Ruelas, Altstaetten SG (CH); Marco Kerschbaumer, Woringen (DE); Stefan Tiefenthaler, Meiningen (AT); Thomas Roller, Dornstetten (DE)

(73) Assignee: Hilti Aktiengesellschaft, Schaan (LI)

( * ) Notice: Subject to any disclaimer, the term of this patent is extended or adjusted under 35 U.S.C. 154(b) by 482 days.

(21) Appl. No.: 18/254,547

(22) PCT Filed: Nov. 10, 2021

(86) PCT No.: PCT/EP2021/081203
§ 371 (c)(1),
(2) Date: May 25, 2023

(87) PCT Pub. No.: WO2022/111994
PCT Pub. Date: Jun. 2, 2022

(65) Prior Publication Data
US 2024/0210173 A1 Jun. 27, 2024

(30) Foreign Application Priority Data
Nov. 30, 2020 (EP) ..................................... 20210557

(51) Int. Cl.
*G01C 15/10* (2006.01)
*G01C 15/00* (2006.01)
(52) U.S. Cl.
CPC ......... *G01C 15/105* (2013.01); *G01C 15/006* (2013.01)
(58) Field of Classification Search
CPC ............................. G01C 15/105; G01C 16/006
See application file for complete search history.

(56) References Cited

U.S. PATENT DOCUMENTS 8,087,176 B1 1/2012 Hayes et al.
8,943,701 B2 * 2/2015 Hayes et al. ......... G01C 15/006
33/280

(Continued)

FOREIGN PATENT DOCUMENTS

CN 202938827 U 5/2013
JP 3-130508 U 12/1991

(Continued)

OTHER PUBLICATIONS

PCT/EP2021/081203, International Search Report dated Jan. 28, 2022 (Two (2) pages).

(Continued)

*Primary Examiner* — John E Breene
(74) *Attorney, Agent, or Firm* — Crowell & Moring LLP

(57) ABSTRACT

A target and plumbing system includes a reflective target. A self-leveling plumb line laser pointer emits a plumb line laser beam having a pathway that is in a vertical direction where the vertical direction is substantially parallel to a gravitational direction. A holding device includes a first holding element and a second holding element. A positioning device includes a first positioning element and a second positioning element where the holding device is connected to the positioning device, the self-leveling plumb line laser pointer is connected to the first positioning element, and the first positioning element is movable with respect to the second positioning element. The holding device is connected to the first positioning element, the second positioning element is a platform including an open space that defines a horizontal two-dimensional area, and the first positioning element is movable with respect to the open space.

18 Claims, 16 Drawing Sheets

(56) References Cited

U.S. PATENT DOCUMENTS

| | | | |
|---|---|---|---|
| 9,494,424 B2 | 11/2016 | Unger | |
| 9,776,320 B2 | 10/2017 | Nishita | |
| 10,690,497 B2 | 6/2020 | Nagashima et al. | |
| 2011/0314684 A1 | 12/2011 | Hayes et al. | |
| 2012/0010847 A1 | 1/2012 | Hamel et al. | |
| 2016/0202058 A1 | 7/2016 | Nagashima et al. | |
| 2017/0252918 A1 | 9/2017 | Nishita | |
| 2018/0202805 A1 | 7/2018 | Unger et al. | |
| 2022/0099440 A1* | 3/2022 | Unger et al. | G01C 3/08 |
| 2022/0404148 A1* | 12/2022 | Hill | G01C 15/004 |

FOREIGN PATENT DOCUMENTS

| | | | |
|---|---|---|---|
| JP | 7-134029 A | 5/1995 | |
| JP | 2000-199712 A | 7/2000 | |
| JP | 3134970 B2 | 2/2001 | |
| JP | 2001-227950 A | 8/2001 | |
| JP | 2016-130655 A | 7/2016 | |
| JP | 2019-2849 A | 1/2019 | |
| WO | WO 2016/031504 A1 | 3/2016 | |

OTHER PUBLICATIONS

U.S. Patent Application, "Target and Plumbing System for Transferring a Point of Interest to a Jobsite Surface", filed May 26, 2023, Inventor Jafet German Sanchez Ruelas et al.

* cited by examiner

TARGET AND PLUMBING SYSTEM FOR TRANSFERRING A POINT OF INTEREST ON A JOBSITE SURFACE

BACKGROUND AND SUMMARY OF THE INVENTION

The technology disclosed herein relates to layouting equipment that is intended to aid in the placement of wall tracks and/or wall structures for the construction of steel frame building and possibly residential structures and is particularly directed to a two-dimensional (2D) layout and point transfer system of the type which identifies points of interest and their coordinates, and transfers identified point of interest to other jobsite surfaces in a vertical direction.

US 2018/0202805 A1 discloses a 2D layout and point transfer system including a single laser controller, a remote controller, and a reflective target. The laser controller includes a laser transmitting device that emits a vertical planar beam of visible laser light, a distance measuring device that measures a distance in a direction coincident with the vertical planar beam to a reflective target, the distance measuring device being rotatable about the substantially vertical axis, an angle measuring device that measures an azimuth angle in a horizontal plane, and a first electronic device including several electronic circuits. The remote controller includes a display device, a user-operated input device, and a second electronic device including several circuits. The laser controller is designed as 2D layout tool that is controlled with a software application installed on the remote controller.

Typically, in a construction building, crews from many trades begin stacking material and tools shortly after the concrete of a deck is poured and before wall layouting is complete. The difficulty for performing the layout and point transfer is that the laser line on the jobsite surface at the floor can be interrupted when material is stored on the floor. For the user, it could be difficult to follow the visible laser line that appears on the jobsite surface, and it could happen that the user must remove material stored on the floor. This process could be exhaustive and time consuming for the user. Another difficulty for performing the layout and point transfer by means of the movable chassis disclosed in US 2018/0202805 A1 is that finding the exact position of the selected point of interest may be difficult and time consuming if the jobsite surface is rough, wet, uneven, grassy, etc. It could happen that the user does not place the reflective target in the exact position and the chassis must be moved forward and backward. This trial and error process may typically be repeated several times before the accuracy of the target is confirmed.

From U.S. Pat. No. 9,494,424 B2 a target and plumbing system is known which is designed for layout and point transfer systems using two laser controllers as disclosed in U.S. Pat. No. 8,087,176 A. The layout and point transfer system according to U.S. Pat. No. 8,087,176 A includes a first laser controller emitting a first vertical planar beam, a second laser controller emitting a second vertical planar beam, a remote controller, and a target and plumbing system. Once the system is set up for a particular jobsite, the two laser controllers are placed on the jobsite surface and aimed at the same point of interest, so that both vertical planar beams create a light line; both light lines are aimed so as to intersect right at that point of interest on the jobsite surface, and thereby produce an "X" shaped pattern of light at the selected point of interest.

In bright-lighting conditions, or in situations where the point of interest is physically a long distance from the laser controllers, the light lines might be relatively difficult to see on the jobsite surface. U.S. Pat. No. 9,494,424 B2 discloses a target and plumbing system including a type of reflective target to highlight the position where the two vertical planar beams intersect on the jobsite surface. The target and plumbing system comprises further to the reflective target a plumb line laser pointer, a holding device, and a positioning device.

The reflective target includes a reflective planar front area and a rear area, wherein the front area includes an aiming area that is smaller than the front area and designed as a translucent portion. The plumb line laser pointer includes a self-leveling mount and at least one laser emitting unit that emits a plumb line laser beam having a pathway that is in a substantially vertical direction. The holding device includes a first holding element that assists in holding the reflective target in an inclined position and a second holding element that assists in holding the plumb line laser pointer. The positioning device includes a first positioning element and a second positioning element, wherein the holding device is connected to the positioning device, the plumb line laser pointer is connected to the first positioning element and the first positioning element is movable to the second positioning element.

To layout a point of interest, the user moves the target and plumbing system near the intersecting point of the two laser lines produced by the first and second vertical planar beam, and the translucent portion produces an easily discernible intersecting pair of the two laser lines. The user will move the plumb line laser pointer with respect to the reflective target, to find that position, in which the intersecting point is aligned to the visible dot that is produced by the plumb line laser pointer on the translucent portion.

The difficulty for performing the layout and point transfer by the target and plumbing system disclosed in U.S. Pat. No. 9,494,424 B2 is that the target and plumbing system is designed for a layout and point transfer system including a first laser controller emitting a first vertical planar beam and a second laser controller emitting a second vertical planar beam. The target and plumbing system does not include a fine positioning of the reflective target via the positioning device since the positioning device is designed to move the plumb line laser pointer with respect to the reflective target. The user must find the exact position by moving the chassis forward and backward. This trial and error process may typically be repeated several times before the accuracy of the reflective target is confirmed.

As a result, there is a need for a target and plumbing system that allows a fine positioning of a reflective target that is used in a layout and point transfer system, which includes only one laser controller with a capability of measuring a distance.

The target and plumbing system is characterized in that the platform includes an open space that defines a two-dimensional area and the holding device is mounted to the platform by a positioning device, wherein the holding device is movable via the positioning device inside the two-dimensional area. The design of the first and second positioning element allows that the first positioning element can be translated in any horizontal translational direction inside the open space. The size and shape of the open space defines the 2D area in which the first positioning element can be translated with respect to the second positioning element.

The target and plumbing system according to the invention allows a fine positioning of both the reflective target and the plumb line laser pointer in any horizontal translational direction inside the open space; there are no restrictions to a first translational direction and a second translational direction that is perpendicular to the first translational direction. Without any restriction to the direction of positioning inside the open space, the target and plumbing system can reduce the time that is necessary to find a point of interest.

In a preferred embodiment, the first positioning element includes an upper plate element, a lower plate element and connecting means that connect the upper plate element and lower plate element, wherein the upper plate element is arranged next to a top side of the platform, the lower plate element is arranged next to a bottom side of the platform and the connecting means are arranged at least partially inside the open space.

The first positioning element including the upper plate element, lower plate element and connecting means can slide above the platform. The upper plate element is in contact with the top side of the platform and the lower plate element is in contact with the bottom side of the platform. The upper plate element and lower plate element generate a frictional connection between them and the platform. The strength of the frictional connection may be adapted via the connecting means and via surface enhancements of the top side of the platform and of a lower surface of the upper plate element such that the first positioning element and all components connected to the first positioning element can slide easily and precisely with respect to the platform when handled by the user for fine positioning. On the other side, the frictional connection should avoid that the first positioning element is moved without interaction of the user during movement of a chassis to which the target and plumbing system is mounted.

In a preferred embodiment, the first positioning element is rotatable about a rotating axis with respect to the second positioning element, wherein the rotating axis is substantially parallel to the gravitational direction. The design of the first positioning element and second positioning element allows that the first positioning element may be rotated about the rotating axis in any translational position such that the user can orient the reflective target and plumb line laser pointer towards the laser controller. Without any restriction to the direction of positioning inside the open space, the target and plumbing system can reduce the time that is necessary to find a point of interest.

In a preferred embodiment, the front area of the reflective target is oriented substantially coplanar to the gravitational direction and the second holding element assists in holding the plumb line laser pointer in a position such that the plumb line laser beam is coincident with the front area, when the reflective target is in use. The preferred embodiment with the front area of the reflective target being oriented substantially coplanar to the gravitational direction and being coincident with the plumb line laser beam allows a fine positioning in only one step. It is not necessary to align the reflective target in a first step, and to align the plumb line laser pointer in a second step.

In a preferred embodiment, the reflective target is shiftable between a first position and a second position that is different from the first position, wherein in the first position the front area is coincident with the plumb line laser beam and in the second position the front area is not coincident with the plumb line laser beam. The preferred embodiment with the reflective target, which is shiftable between the first position and the second position, allows that the plumb line laser beam generated by the plumb line laser pointer can generate an upper plumb point on a ceiling of the jobsite. In the first position, the reflective target blocks the plumb line laser beam in the upwards-directed vertical direction, and in the second position In a preferred embodiment, the reflective target is pivotable about a pivoting axis between the first position and the second position. By pivoting the reflective target about the pivoting axis, the reflective target is shiftable between the first position and the second position.

Preferably, in the second position, the front area is oriented substantially perpendicular to the gravitational direction. By pivoting the reflective target about the pivoting axis between the first position, in which the front area is oriented substantially coplanar to the gravitational direction, and the second position, in which the front area is oriented substantially perpendicular to the gravitational direction, the first and second positions are well-defined for the user.

In a preferred embodiment, the reflective target includes a blocking element that is arranged in the pathway of the plumb line laser beam, when the reflective target is in use. The plumb line laser pointer of the target and plumbing system can emit a plumb line laser beam that includes a downward-going plumb line laser beam and an upward-going plumb line laser beam. The blocking element may be arranged in the pathway of the upward-going plumb line laser beam. Blocking of the upward-going plumb line laser beam reduces the number of laser lines on the front area and reduces misuse of the target and plumbing system. The target and plumbing system should be aligned via the vertical planar beam and not via the upward-going plumb line laser beam that could also generate a laser line on the front area.

In a preferred embodiment, the target and plumbing system includes a connecting unit, which is connected to the second positioning element and is provided to be connected to a movable and/or portable chassis. Preferably, the connecting unit includes a standard interface, e.g., ⅝ inches thread, such that the target and plumbing system can be connected to preexisting movable and/or portable chassis.

A further aspect of the invention is related to a movable and/or portable layout accessory comprising the target and plumbing system according to the invention, and a movable and/or portable chassis. A movable and/or portable chassis allows for the user a comfortable handling of the target and plumbing system. Dependent on the circumstances of the jobsite the chassis may be designed as portable chassis and/or as movable chassis. The movable chassis may include wheels, rollers or sliding elements and the portable chassis may include foot elements in different embodiments.

In a preferred embodiment of the layout accessory, the target and plumbing system is connected to an operating element. To layout points of interest on ceiling surfaces, the chassis can be extended to its maximum length. In the extended position, the target and plumbing system may be not operable by the user. To operate the target and plumbing system, the positioning device may be connected to the operating element that can be operated by the user. The operating element allows to arrange the target and plumbing system in a height such that a line-of-sight between the laser controller and the reflective target may not be interrupted by material and/or tools stored on the jobsite or by users working on the jobsite; the distance measuring can be performed with high accuracy. The operating element may be connected to the first positioning element, the holding device, the plumb line laser pointer and/or the reflective target.

In a preferred embodiment of the layout accessory, the target and plumbing system is mounted to an extension arm. The use of an extension arm may allow to mount the target and plumbing system at a first end of the extension arm and the remote controller at a second end of the extension arm. The extension arm allows to balance the target and plumbing system and the remote controller.

A further aspect of the invention is related to a layout and point transfer system to find a predetermined point of interest, which comprises:

a laser controller, including: (i) a laser transmitting device that emits a vertical planar beam of visible laser light, the vertical planar beam being substantially perpendicular to a gravitational direction and being rotatable about a first rotating axis; (ii) a distance measuring device that emits a measuring beam and measures a distance, the distance measuring device being rotatable about the first rotating axis; (iii) an angle measuring device that measures an azimuth angle of the laser transmitting device in a horizontal plane with respect to a zero angle, the horizontal plane being substantially perpendicular to the gravitational direction; and (iv) a first processing circuit, a first memory circuit including instructions executable by the first processing circuit, a first communications circuit, and a first input/output interface circuit, a remote controller, including: (i) a display device; (ii) a user-operated input circuit; and (iii) a second processing circuit, a second memory circuit including instructions executable by the second processing circuit, a second communications circuit, and a second input/output interface circuit, wherein the laser controller and the remote controller communicate with one another by use of the first communications circuit and second communications circuit, the target and plumbing system according to the invention, the target and plumbing system comprising a movable unit including the reflective target, the plumb line laser pointer, the holding device and the first positioning element, wherein the movable unit is movable with respect to the second positioning element, and the reflective target being arranged in the first position, wherein the first and second processing circuits are configured:

using the laser transmitting device, to emit the substantially vertical planar beam, and using the distance measuring device, to emit the measuring beam, using the angle measuring device, to aim the vertical planar beam and the measuring beam in a predetermined azimuth angle such that the vertical planar beam and the measuring beam cross a predetermined point of interest on a jobsite surface, using the distance measuring device, to measure a distance between the distance measuring device and the reflective target, as the target and plumbing system is moved along the vertical planar beam and the measuring beam, using the remote controller and/or the laser controller, to calculate a deviation between the measured distance and a distance between the point of interest and the laser controller, using the remote controller and/or the laser controller, to output a visible and/or audible indication that corresponds to the deviation, using the visible and/or audible indication, to move the movable unit of the target and plumbing system with respect to the second positioning element until the vertical planar beam and the measuring beam cross the aiming area and until the deviation is zero or at least smaller than a predetermined second limit, the second limit being smaller than the first limit.

The layout and point transfer system according to the invention supports the user in layouting points of interest rapid and accurate. The accuracy of layouting is independent of the circumstances of the jobsite surface since the fine positioning is performed by the target and plumbing system. The layout and point transfer system allows a fine positioning of both the reflective target and the plumb line laser pointer in any horizontal translational direction inside the open space of the platform; there are no restrictions to a first translational direction and a second translational direction that is perpendicular to the first translational direction. Without any restriction to the direction of positioning inside the open space, the layout and point transfer system according to the invention can reduce the time that is necessary to find a point of interest.

In a preferred embodiment, the first and second processing circuits are configured using the plumb line laser pointer, emitting the plumb line laser beam and generating a lower plumb point on the floor of the jobsite and/or an upper plumb point on the ceiling of the jobsite. Since the plumb line laser beam is coincident with the point of interest, the plumb line laser beam can be used to transfer the point of interest vertically with high accuracy to jobsite surfaces. A downward-going plumb line laser beam can be used to transfer the point of interest to the floor and an upward-going plumb line laser beam can be used to transfer the point of interest to the ceiling.

A further aspect of the invention is related to a method for layouting and transferring a point of interest, the method comprises the following method steps:

providing a laser controller, which includes: (i) a laser transmitting device that emits a vertical planar beam of visible laser light, the vertical planar beam being substantially perpendicular to a gravitational direction and being rotatable about a first rotating axis; (ii) a distance measuring device that emits a measuring beam and measures a distance, the distance measuring device being rotatable about the first rotating axis; (iii) an angle measuring device that measures an azimuth angle of the laser transmitting device in a horizontal plane with respect to a zero angle, the horizontal plane being substantially perpendicular to the gravitational direction; and (iv) a first processing circuit, a first memory circuit including instructions executable by the first processing circuit, a first communications circuit, and a first input/output interface circuit, providing a remote controller, which includes: (i) a display device; (ii) a user-operated input circuit; and (iii) a second processing circuit, a second memory circuit including instructions executable by the second processing circuit, a second communications circuit, and a second input/output interface circuit, wherein the laser controller and the remote controller communicate with one another by use of the first communications circuit and second communications circuit, providing the target and plumbing system according to the invention, the target and plumbing system comprising a movable unit including the reflective target, the plumb line laser pointer, the holding device and the first positioning element, wherein the movable unit is movable with respect to the second positioning element, and arranging the reflective target in the first position, placing the laser controller on a jobsite surface in a work area, finding the predetermined point of interest, by:

using the laser transmitting device, emitting the substantially vertical planar beam, and using the distance measuring device, emitting the measuring beam, using the angle measuring device, aiming the vertical planar beam and the measuring beam in a predetermined azimuth angle such that the vertical planar beam and the measuring beam cross the point of interest, moving the target and plumbing system until the vertical planar beam and the measuring beam cross the front area of the reflective target, using the distance measuring device, measuring a distance between the distance measuring device and the target and plumbing system, as the target and plumbing system is moved along the vertical planar beam and the measuring beam, using the remote controller and/or the laser controller, calculating a deviation between the measured distance and a distance between the point of interest and the laser controller, using the remote controller and/or the laser controller, outputting a visible and/or audible indication that corresponds to the deviation, while monitoring the visible and/or audible indication, moving the target and plumbing system along the vertical planar beam and the measuring beam until the deviation is smaller than a predetermined first limit, stopping the movement of the target and plumbing system along the vertical planar beam and the measuring beam, and arranging the target and plumbing system in a stable and substantially leveled position, while monitoring the visible and/or audible indication, moving the movable unit of the target and plumbing system with respect to the second positioning element until the vertical planar beam and the measuring beam cross the aiming area and until the deviation is zero or at least smaller than a predetermined second limit, the second limit being smaller than the first limit.

The inventive method for using a layout and point transfer system supports the user in layouting points of interest rapid and accurate. The accuracy of layouting is independent of the circumstances of the jobsite surface since the fine positioning is performed by the target and plumbing system.

In a first preferred embodiment, the method comprises the further steps:

using the plumb line laser pointer, emitting the plumb line laser beam and generating a lower plumb point on the floor of the jobsite, and transferring the lower plumb point onto the floor of the jobsite.

Since the plumb line laser beam is coincident with the point of interest, the plumb line laser beam can be used to transfer the point of interest vertically with high accuracy to the floor. The downward-going plumb line laser beam generates the lower plumb point on the floor that may be transferred by the user to the floor.

In a second preferred embodiment, the method comprises the further steps:

arranging the reflective target in the second position, using the plumb line laser pointer, emitting the plumb line laser beam and generating a lower plumb point on the floor of the jobsite and an upper plumb point on the ceiling of the jobsite, and transferring the lower plumb point and/or the upper plumb point onto the ceiling of the jobsite.

In the second position of the reflective target, the plumb line laser pointer can emit a downward-going plumb line laser beam generating the lower plumb point and an upward-going plumb line laser beam generating the upper plumb point. The point of interest can be transferred with high accuracy via the lower plumb point to the floor and/or via the upper plumb point to the ceiling.

In a third preferred embodiment, the method comprises the further steps:

using the plumb line laser pointer, emitting the plumb line laser beam and generating a lower plumb point on the floor of the jobsite, transferring the lower plumb point onto the floor of the jobsite, arranging the reflective target in the second position, using the plumb line laser pointer, emitting the plumb line laser beam and generating an upper plumb point on the ceiling of the jobsite, and transferring the upper plumb point onto the ceiling of the jobsite.

In the first position of the reflective target, the upward-going plumb line laser beam may be blocked by the blocking element of the reflective target. To transfer the point of interest to the ceiling, the reflective target must be arranged in the second position. When the reflective target is arranged in its second position, the upward-going plumb line laser beam can generate an upper plumb point on the ceiling that can be transferred by the user to the ceiling.

The aspects of the invention are described or explained in more detail below, purely by way of example, with reference to working examples shown schematically in the drawings. Identical elements are labelled with the same reference numerals in the figures. The described embodiments are generally not shown true in scale and they are also not to be interpreted as limiting the invention.

DETAILED DESCRIPTION OF THE DRAWINGS

Figure 1A:
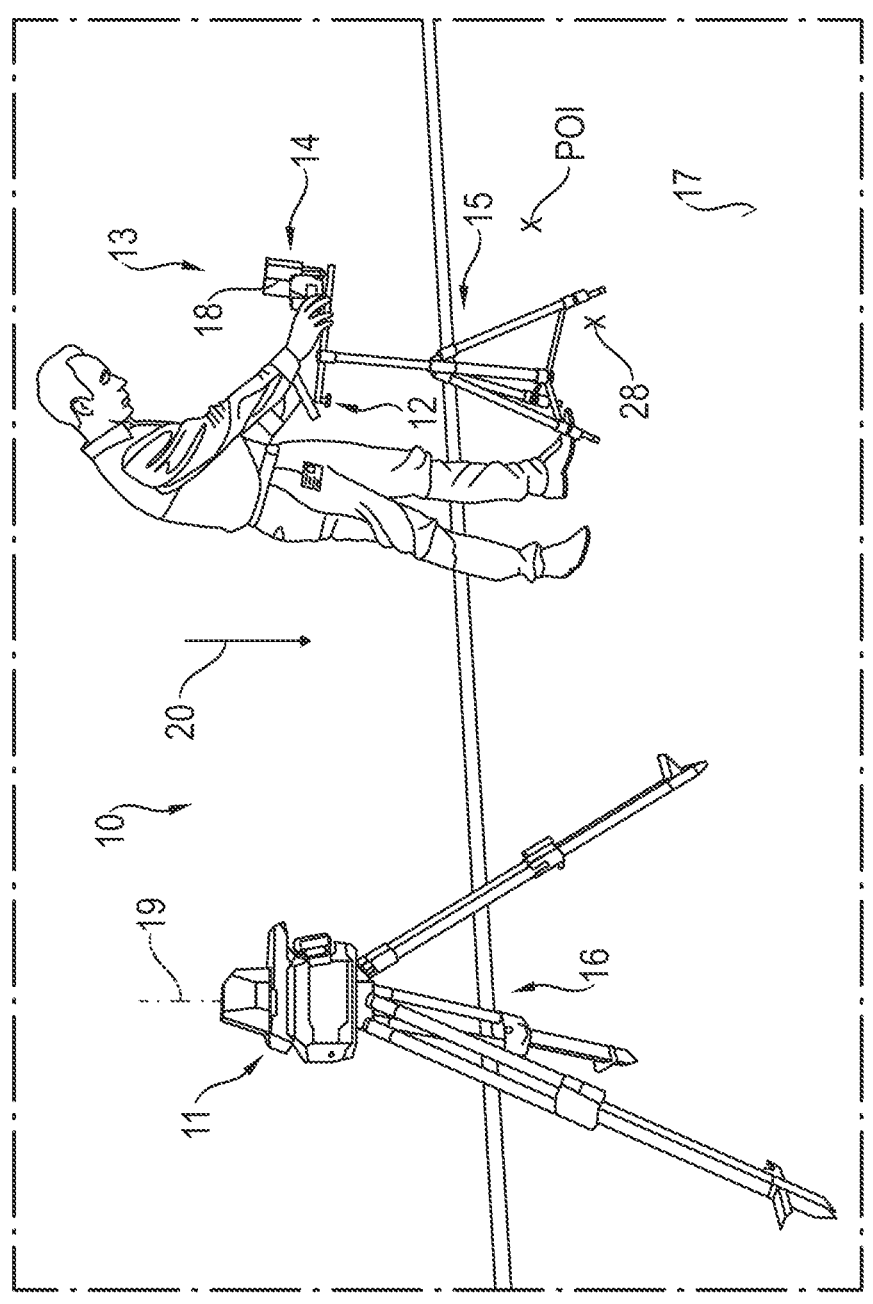
FIGS. 1A, B show a layout and point transfer system that includes a laser controller arranged on a tripod device, a remote controller, and a first embodiment of a layout accessory including a target and plumbing system and a movable chassis.

Reference will now be made in detail to the present preferred embodiment, an example of which is illustrated in the accompanying drawings. It is to be understood that the technology disclosed herein is not limited in its application to the details of construction and the arrangement of components set forth in the following description or illustrated in the drawings. The technology disclosed herein is capable of other embodiments and of being practiced or of being carried out in various ways.

Also, it is to be understood that, the phraseology and terminology used herein is for the purpose of description and should not be regarded as limiting. The use of "including, or "comprising, or "having" and variations thereof herein is meant to encompass the items listed thereafter and equivalents thereof as well as additional items. Unless limited otherwise, the terms "connected", "coupled", and "mounted", and variations thereof herein are used broadly and encompass direct and indirect connections, couplings, and mountings. In addition, the terms "connected" and "coupled", and variations thereof are not restricted to physical or mechanical connections or couplings.

FIGS. 1A, B show a layout and point transfer system 10 that is designed for layouting and transferring points of interest vertically to a jobsite surface according to the present invention. The layout and point transfer system 10 comprises a laser controller 11, a remote controller 12, and a first embodiment of a layout accessory 13 including a target and plumbing system 14 and a movable chassis 15. The target and plumbing system 14 and the remote controller 12 are mounted to the chassis 15 and the laser controller 11 is mounted on a tripod device 16, wherein the chassis 15 and tripod device 16 are arranged on a floor 17.

The basic concept of the layout and point transfer system 10 is generally illustrated in FIG. 1A. The laser controller 11 is designed as two-dimensional (2D) layout tool that is controlled with a software application installed on the remote controller 12, which is designed as a tablet computer. The laser controller 11 includes a laser transmitting device that produces a vertical planar beam 18 of visible laser light to indicate heading and includes a distance measuring device that provides a capability of measuring a distance between the laser controller 11 and the target and plumbing system 14, which is located at the user and handled by the user. The laser controller 11 can rotate the vertical planar beam 18 about a first rotating axis 19 that is substantially parallel to a gravitational direction 20, to direct the vertical planar beam 18 through a point of interest POI on a jobsite surface that can be the floor 17 or a ceiling. This action directly provides a visible heading for the user to show him that the point of interest POI is located somewhere along the vertical planar beam 18. The distance measuring device outputs a narrow measuring beam 21 that is substantially aligned and coincident with the vertical planar beam 18. The measuring beam 21 can be a visible laser beam or an infrared laser beam.

Figure 1B:
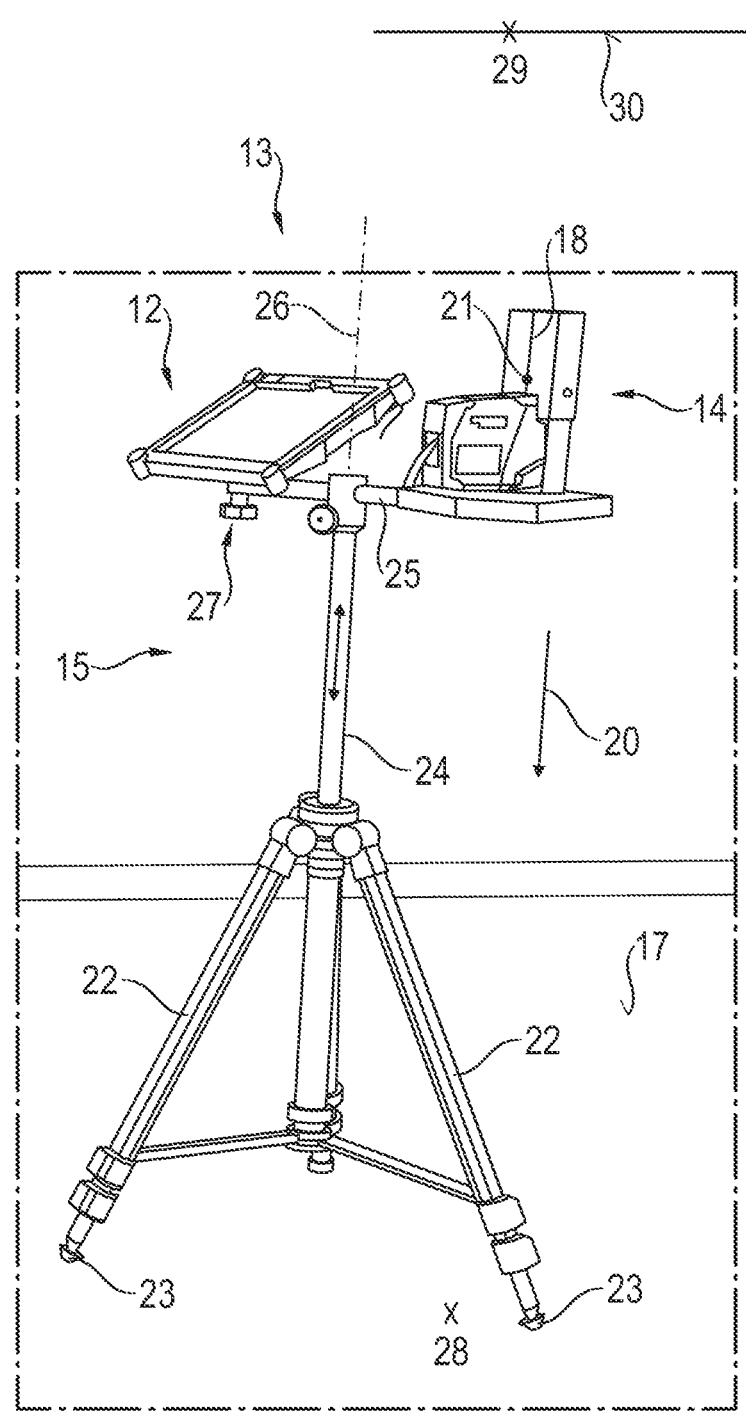

FIG. 1B shows the layout accessory 13 in detail. The layout accessory 13 includes the target and plumbing system 14 and the movable chassis 15, which is designed as a tripod device. The tripod device 15 includes three legs 22, which may be adjusted in length, three sliding elements 23, which allow the layout accessory 13 to slide over the floor 17, a central rod 24, which may be adjusted along a height direction, and an extension arm 25, which is mounted to the central rod 24. In FIG. 1B, the central rod 24 is arranged in its highest position with respect to a head of the tripod device 15. The target and plumbing system 14 can be placed via the tripod device 15 at whatever height is needed dependent on the conditions of the jobsite between a minimum position and a maximum position.

The target and plumbing system 14 and the remote controller 12 are mounted on proximal ends of the extension arm 25, which is pivotable about a pivoting axis 26 being substantially coaxially aligned to the height direction of the central rod 24. The remote controller 12 is mounted via a bracket element 27 to the extension arm 25, wherein the position of the bracket element 27 may be shifted along the extension arm 25. The extension arm 25 allows to balance the target and plumbing system 14 and the remote controller 12.

The target and plumbing system 14 can be connected to the central rod 24 via a connecting unit 27, which includes a standard interface, e.g., ⅝ inches thread, such that the target and plumbing system 14 can be connected to a preexisting movable and/or portable chassis, such as the tripod 15. The target and plumbing system 14 can generate a lower plumb point 28 on the floor 17 and an upper plumb point 29 on a ceiling 30 of the jobsite. The lower and/or upper plumb points 28, 29 can be used to transfer a point of interest on the floor 17 and/or on the ceiling 30.

Figure 2A:
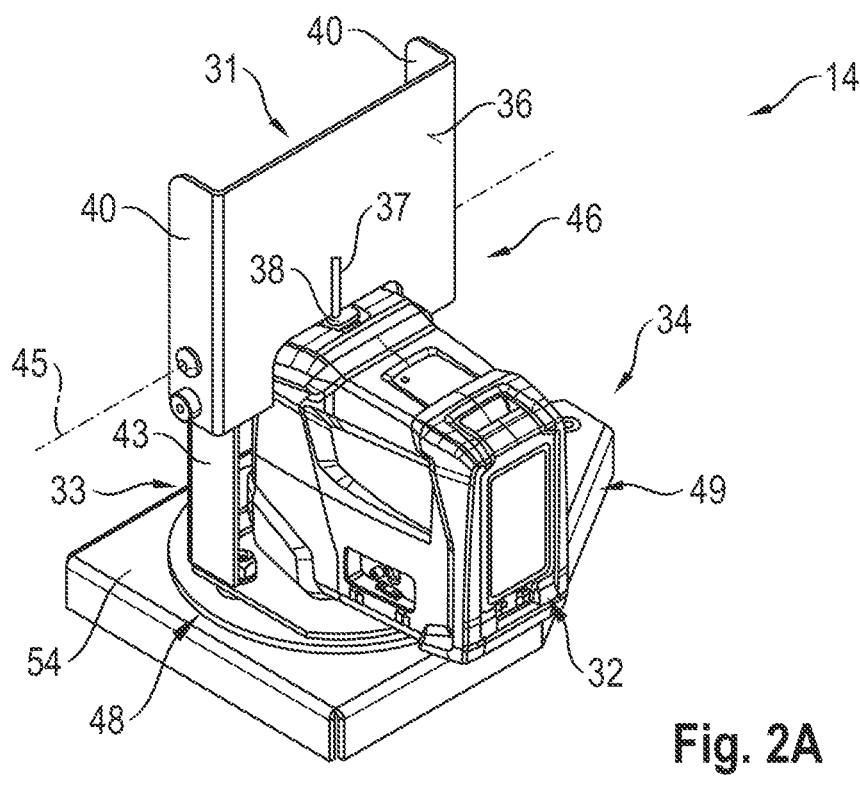
FIGS. 2A-C show the target and plumbing system of FIG. 1, which includes a reflective target being shiftable between an in use position and an out of use position, wherein the target and plumbing system is shown in the in use position in a view on a front area (FIG. 2A) and on a rear area of the reflective target (FIG. 2B) and wherein the reflective target is shown in the out of use position (FIG. 2C)
Figure 2B:
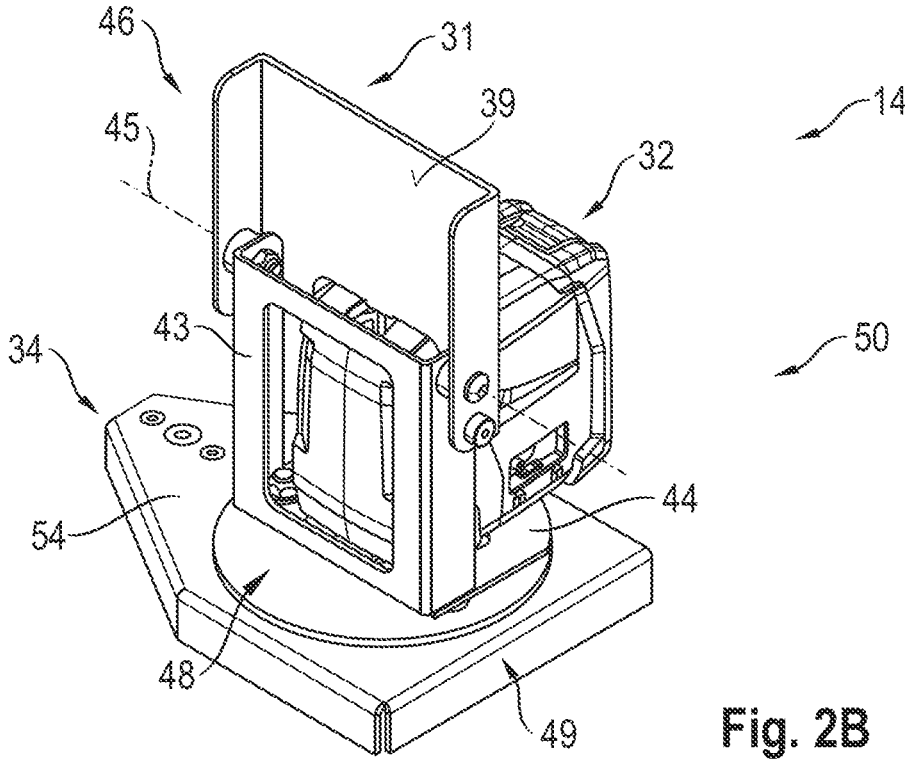
Figure 2C:
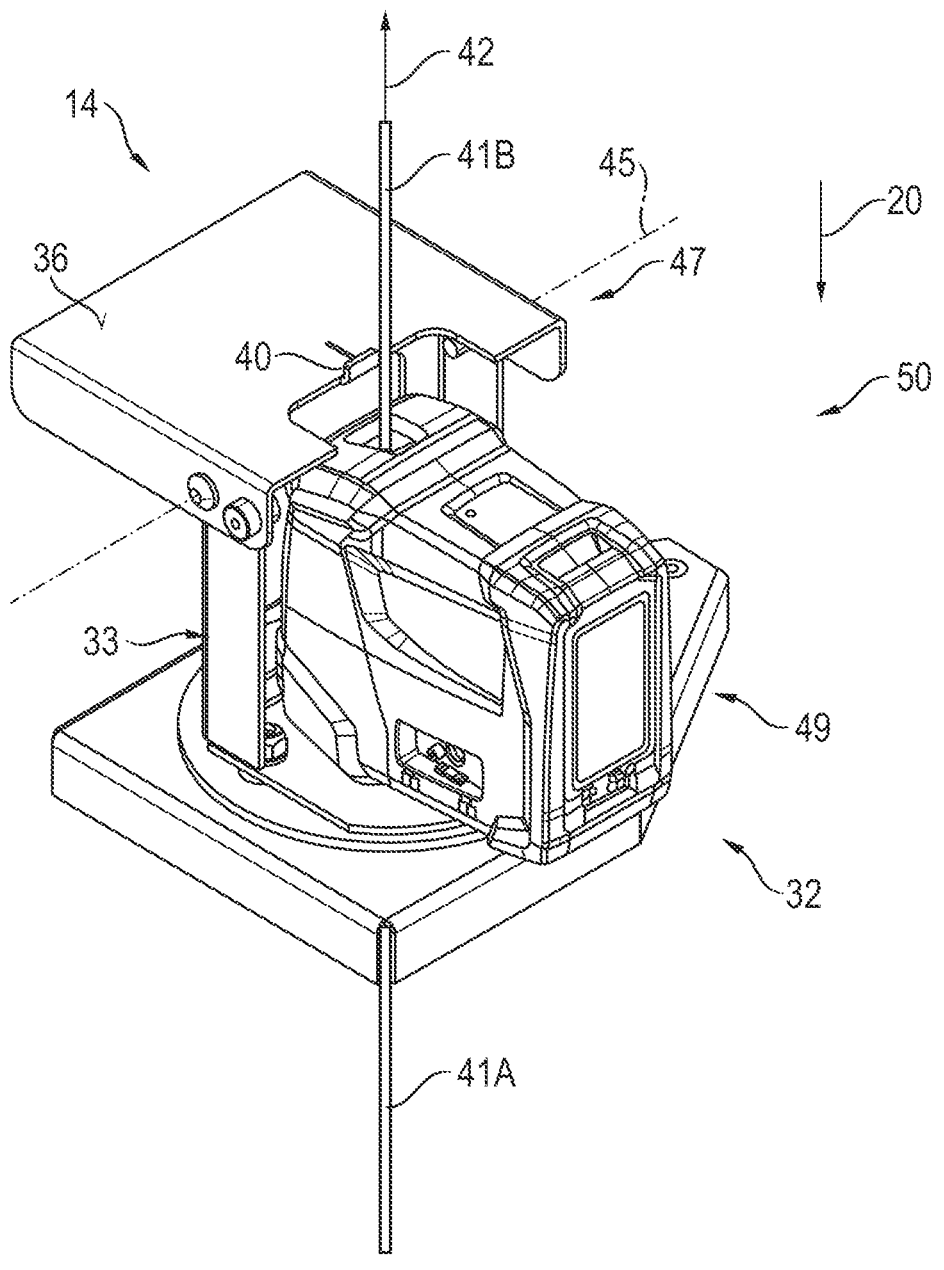

FIGS. 2A-C show the target and plumbing system 14, which includes a reflective target 31 being shiftable between an in use position and an out of use position, wherein the target and plumbing system 14 is shown in the in use position in a view on a front area (FIG. 2A) and on a rear area of the reflective target 31 (FIG. 2B) and wherein the reflective target 31 is shown in the out of use position (FIG. 2C). The target and plumbing system 14 includes further to the reflective target 31 a self-leveling plumb line laser pointer 32, a holding device 33 and a positioning device 34.

The reflective target 31 is formed as a U-shaped part and includes a reflective planar front area 36 having an aiming area 37 being smaller than the front area 36, a blocking element 38, a rear area 39, and two shoulders 40. The front area 36 is at least partially reflective for the wavelength of the vertical planar beam 18 and for the wavelength of the measuring beam 21.

The self-leveling plumb line laser pointer 32 includes a self-leveling mount and at least one laser emitter, which emits a plumb line laser beam 41 having a pathway that is in a substantially vertical direction 42, wherein the plumb line laser beam 41 includes a downward-going plumb line laser beam 41A and an upward-going plumb line laser beam 41B. Since the plumb line laser beam 41 is used for transferring points of interest vertically on the floor 17 and/or on the ceiling 30, the wavelength of the plumb line laser pointer 32 may be in the visible range, e.g., red or green range.

The holding device 33 may be formed as cage or similar component and includes a first holding element 43 that assists in holding the reflective target 31 in a defined position and a second holding element 44 that assists in holding the plumb line laser pointer 32 in a defined position. The reflective target 31 is mounted to the first holding element 43 and is pivotable about a pivot axis 45 between a first position 46 and a second position 47. In the first position 46, the front area 36 is oriented substantially coplanar to the gravitational direction 20, and in the second position 47, the front area 36 is oriented substantially perpendicular to the gravitational direction 20. It should be noted that the exact orientation of the second position 47 is completely up to the system designer and could be either somewhat more or somewhat less with respect to the horizontal plane. Of course, it probably could be desirable to have a second position 47 which is well-defined from the first position 46.

The first position 46 is also called in use position for the reflective target 31, which is illustrated in FIG. 2A and FIG. 2B, and the second position 47 is also called out of use position for the reflective target 31, which is illustrated in FIG. 2C. When the reflective target 31 is in use (first position 46), its front area 36 is oriented substantially coplanar to the gravitational direction 20 and the plumb line laser beam 41 is coincident with the front area 36. When the reflective target 31 is out of use (second position 47), its front area 36 and the plumb line laser beam 41 are not coincident with each other.

In the first position 46 of the reflective target 31, the blocking element 38 is arranged within the pathway of the upward-going plumb line laser beam 41B, so that the upward-going plumb line laser beam 41B is blocked. Blocking of the upward-going plumb line laser beam 41B reduces the number of laser lines on the front area 36 and reduces misuse of the target and plumbing system 14. The target and plumbing system 14 should be aligned via the vertical planar beam 18 and not via the upward-going plumb line laser beam 41B that could also generate a laser line on the front area 36.

The positioning device 34 includes a first positioning element 48 and a second positioning element 49, wherein the holding device is connected to the first positioning element 48 and the first positioning element 48 is movable to the second positioning element 49. The target and plumbing system 14 is composed of a movable unit 50 that includes the reflective target 31, the plumb line laser pointer 32, the holding device 33 and the first positioning element 41. The movable unit 50 is movable to the second positioning element 49.

Figure 3A:
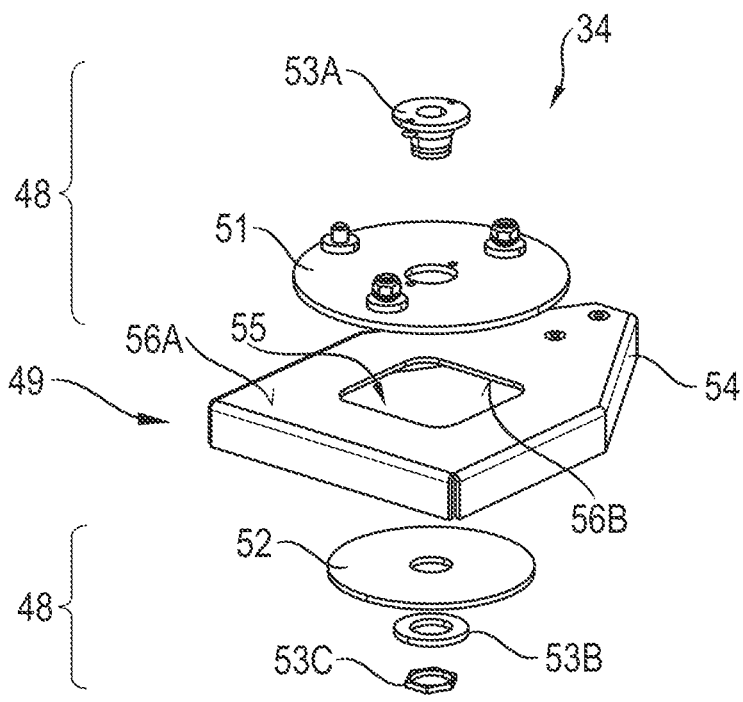
FIGS. 3A, B show a positioning device of the target and plumbing system of FIG. 1 in an exploded view (FIG. 3A) and in a longitudinal cut parallel to a vertical plane (FIG. 3B)
Figure 3B:
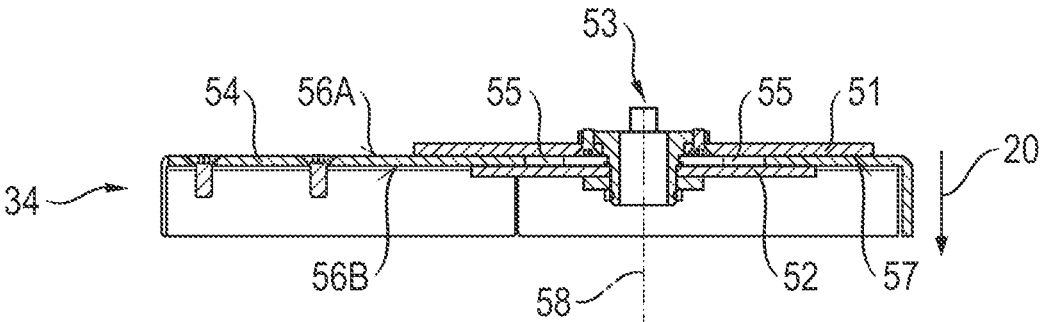

FIGS. 3A, B show the positioning device 34 of the target and plumbing system 14 in an exploded view (FIG. 3A) and in a longitudinal cut parallel to a vertical plane (FIG. 3B). The positioning device 34 includes the first positioning element 48 and the second positioning element 49.

The first positioning element 48 includes an upper plate element 51, a lower plate element 52 and connecting means 53 that connect the upper plate element 51 and lower plate element 52 to each other. The second positioning element 49 is designed as platform 54 including an open space 55 that defines a region of a substantially horizontal two-dimensional area.

In the assembled state of the positioning device 34 shown in FIG. 3A, the upper plate element 51 is arranged next to a top side 56A of the platform 54 and the lower plate element 52 is arranged next to a bottom side 56B of the platform 54. The upper and lower plate elements 51, 52 are connected by the connecting means 53 which may include a screw 53A, a washer 53B and a screw nut 53C. The connecting means 53 are arranged at least partially inside the open space 55 of the platform 54 and may be moved inside that 2D area defined by the open space 55. The movement of the first positioning element 48 is limited in the horizontal plane only by the edges of the open space 55, wherein inside the open space 55 there is no restriction for the movement.

The upper plate element 51 and lower plate element 52 generate a frictional connection between them and the platform 54. The strength of the frictional connection may be adapted via the connecting means 53 and via surface enhancements of the top side 56A of the platform 54 and of a lower surface 57 of the upper plate element 51. The upper plate element 51, the lower plate element 52 and the platform 54 may be fabricated from metal or any other suitable material, such as plastic. The strength of the frictional connection may be adapted such that the first positioning element 48 and all components connected to the first positioning element 48 can slide easily and precisely with respect to the platform 54 when handled by the user for fine positioning. On the other side, the frictional connection should avoid that the first positioning element 48 is moved without interaction of the user during movement of a chassis to which the target and plumbing system 14 is mounted.

A good balance between easy and precise sliding on one side and a stable position on another side can be reached by special combinations of materials and/or by using a brake element. For example, the connecting means 53 of the positioning device 34 can be used to define a sliding mode and a brake mode for the positioning device 34. By the screw nut 53C the strength of the frictional connection can be adapted. In a first position of the connecting means 53, the strength of the frictional connection allows an easy and precise sliding of the first positioning element 48 over the platform 54. By turning the screw nut 53C, the connecting means 53 are shifted from the first position that corresponds to the sliding mode to a second position that corresponds to the brake mode. The strength of the frictional connection in the brake mode is increased compared to the sliding mode such that a sliding of the first positioning element 48 over the platform 54 is prevented. It should be noted that the screw nut 53C or any other brake element should allow easy access for the user to handle the brake element.

To enable the plumb line laser pointer 32 to direct the plumb line laser beam 37 downward to the floor 17, all elements of the positioning device 34 include an opening to permit the passage of the plumb line laser beam 37. The openings are designed to be substantially at the center of the elements, although it is not necessary, if the system designer wishes to move the openings to a different position. The integration of openings into the components of the positioning device 34 allows a compact design of the target and plumbing system 14.

The platform 54 is composed of a first part that is designed for fine positioning and a second part that is designed for mounting the platform 54 to a movable and/or portable chassis, such as the tripod device 15. The first part of the platform 54 includes the open space 55, arranged substantially at the center of the first part, although it is not necessary, if the system designer wishes to move the open space 55 to a different position. It should be noted that also the size and the shape of the open space 55 are completely up to the system designer. Of course, it probably could be desirable to have an open space 55, which is symmetrically in its dimensions and which allows a fine positioning of the reflective target 31 and the plumb line laser pointer 32 within a suitable range, e.g., 5 cm.

The target and plumbing system 14 is composed of the movable unit 50 that is movable with respect to the second positioning element 49 in any horizontally translational direction inside the open space 55 and is rotatable about a rotating axis 58 that is substantially parallel to the gravitational direction 20. The design of the movable unit 50 and the second positioning element 49 allows that the movable unit 50 may be rotated about the rotating axis 58 in any translational position such that the user can orient the reflective target 31 towards the laser controller 11.

Figure 4:
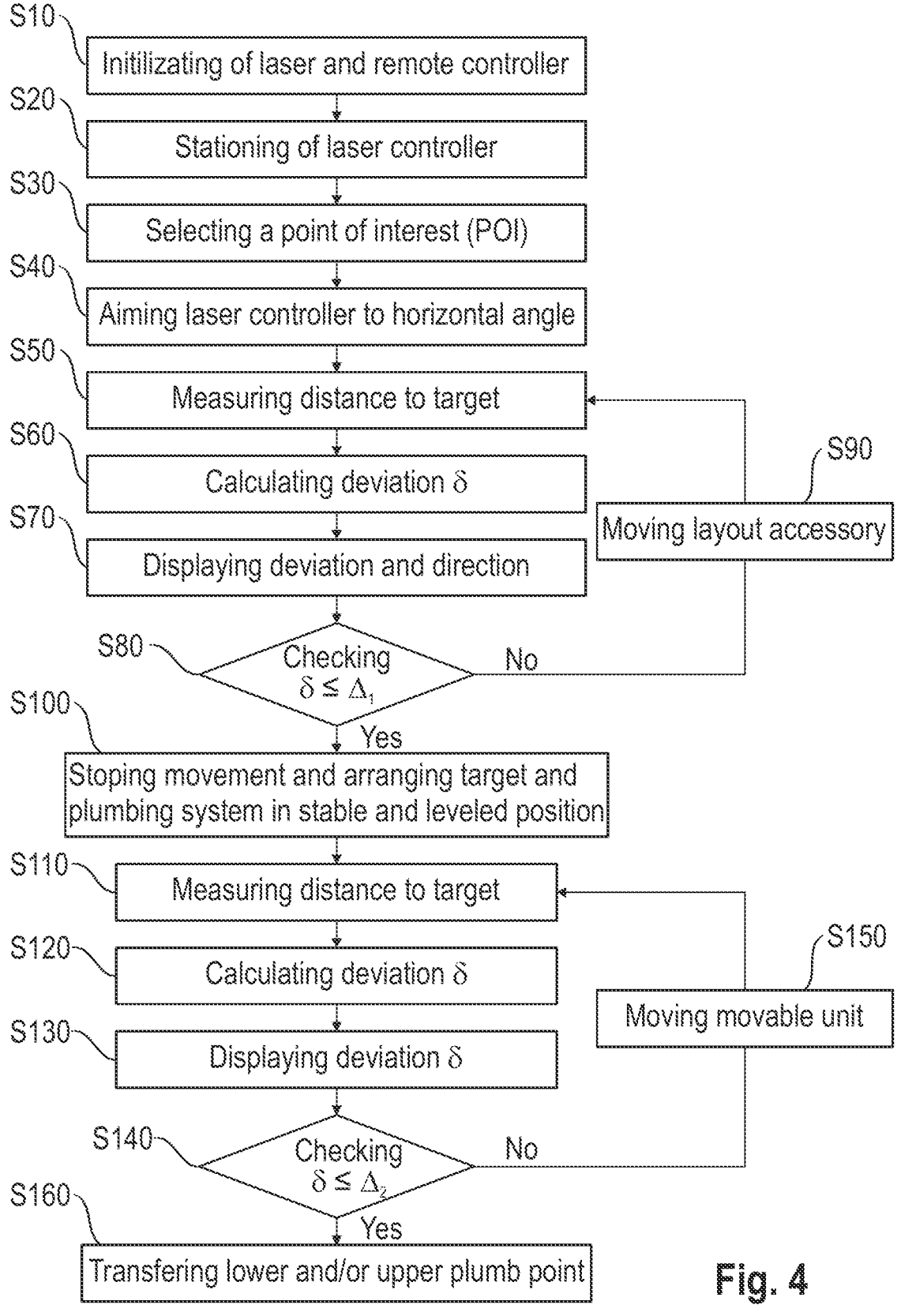
FIG. 4 is a flow chart showing the steps of a method for layouting and transferring a point of interest using the layout and point transfer system.

FIG. 4 shows a flow chart showing steps of a method for layouting and transferring a point of interest by using the layout and point transfer system 10. Before layout and point transfer can start, the laser controller 11 and remote controller 12 must be initialized (step S10) and the laser controller 11 must be stationed to the jobsite (step S20).

The first topic for the user after initializing the laser controller 11 and remote controller 12, and after stationing the laser controller 11 to jobsite is to input or select one point of interest (POI) or several points of interest to the layout and point transfer system 10 (step 30). In case that the point of interest is inputted to the remote controller 12, the remote controller 12 will send the coordinates of the selected point of interest (POI coordinates) or a command to aim the vertical planar beam 18 at a specific azimuth angle to the laser controller 11. The laser controller 11 receives the POI coordinates or the command to aim the vertical planar beam 18 at the specific azimuth angle from the remote controller 12.

After selecting the point of interest, the laser controller 11 will emit the vertical planar beam 18 and perform periodic distance measurements. At step S40, the laser controller 11 will rotate the vertical planar beam 18 and the measuring beam 21 towards the selected point of interest such that the vertical planar beam 18 crosses the selected point of interest. The laser controller 11 will perform periodic distance measurements and will send the measured distance values to the remote controller 12 (step S50). The sample rate should be quite fast, so that the user feels he is receiving almost continuous updates of the distance value.

At step S60, the remote controller 12 will calculate a deviation d between the measured distance value and the distance of the selected point of interest to the laser controller 11. The remote controller 12 will display the calculated deviation d and the direction (backwards or forwards) to the user (step S70). At step S80, the remote controller 12 will check if the deviation d is smaller than a predetermined first limit $D_1$, e.g., 5 cm. The user will move the layout accessory 13 instructed by the remote controller 12 towards the selected point of interest (step S90), and the loop of steps S50 to S80 will be repeated until the deviation d is smaller than the first limit $D_1$.

In case that the deviation d is smaller than the first limit $D_1$, the remote controller 12 can display a message to the user that he can stop the movement, and the user will stop the movement of the layout accessory 13 and arrange the target and plumbing system 14 in a stable and substantially leveled position (step S100). To avoid measuring errors, the user can use an adjusting element and a bubble level on the target and plumbing system 14 to make sure that the target and plumbing system 14 is leveled properly. The target and plumbing system 14 is called to be leveled properly when the plumb line laser pointer 32 is arranged in its self-leveling range.

The laser controller 11 will perform periodic distance measurements (step S110) and will send the measured distance values to the remote controller 12. The remote controller 12 will calculate the deviation d between the measured distance value and the distance of the selected point of interest to the laser controller 11 (step S120) and display the deviation d and the direction (backwards or forwards) to the user (step S130). The user will move the mobile unit 50 with respect to the platform 46 instructed by the remote controller 12 towards the selected point of interest (step S150), and the loop of steps S110 to S140 will be repeated until the calculated deviation d is smaller than a predetermined second limit $D_2$, e.g., 1 mm.

In case that the calculated deviation d is smaller than the predetermined second limit $D_2$ the remote controller 12 can display a message to the user that the selected point of interest has been reached and that the user can now transfer the point of interest to the jobsite surface, on the floor 17 and/or on the ceiling 30. The plumb line laser pointer 32 can generate on the floor 17 the lower plumb point 28, which can be transferred by the user to the floor 17, and on the ceiling 30 the upper plumb point 29, which can be transferred by the user to the ceiling 30 (step S160). To transfer the point of interest to the ceiling 30 of the jobsite, the user shifts the reflective target 31 from its first position, in which the upward-going plumb line laser beam is blocked, to its second position, in which the pathway of the plumb line laser beam is free in both directions.

After transferring the selected point of interest to the floor 17 and/or to the ceiling 30, the method for layouting and transferring the point of interest may be continued with selecting a new point of interest in step 30. The steps S40 to S160 can be repeated for each point of interest of a list of points of interest stored in the remote controller 12.

Figure 5:
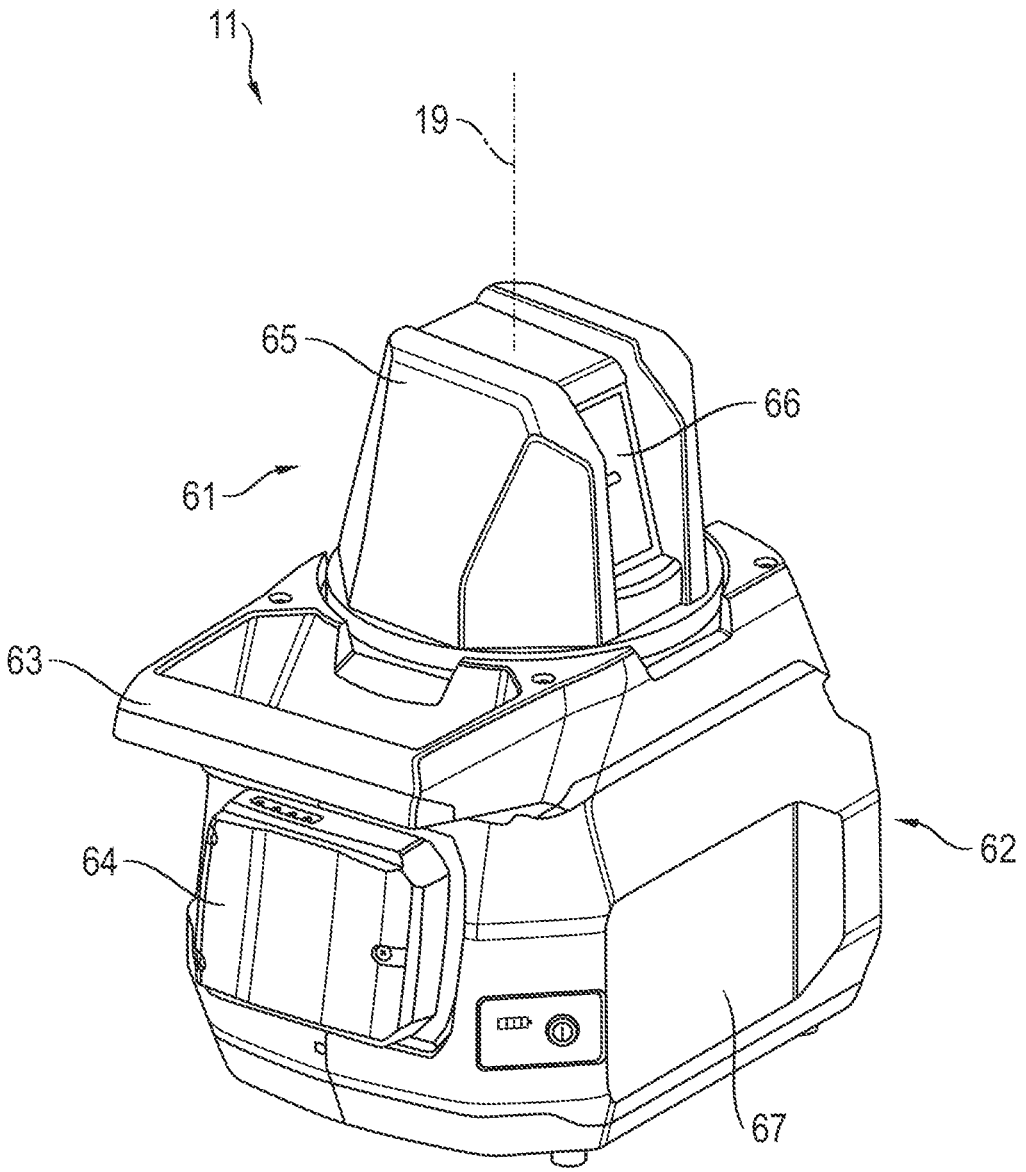
FIG. 5 is an exemplary version of the laser controller used in the layout and point transfer system of FIG. 1.

FIG. 5 shows an exemplary version of the laser controller 11 used in the layout and point transfer system 10. The laser controller 11 is designed as a 2D layout tool and comprises a measuring head 61, a rotating and leveling device 62, a grip 63, and a battery 64 for powering the laser controller 11.

The measuring head 61 is enclosed by a first housing 65 which includes a laser exit window 66. A laser transmitting device (not shown) that emits the vertical planar beam 18 and a distance measuring device (not shown) that emits the narrow measuring beam 21 are located in the first housing 65, wherein the vertical planar beam 18 and the measuring beam 21 are emitted through the laser exit window 66. The measuring head 61 can rotate completely around its circumference at a full 360° angle about the first rotating axis 19.

The rotating and leveling device 62 is enclosed by a second housing 67. An angle measuring device (not shown), an azimuth motor device (not shown), a leveling motor device (not shown), and a first electronic device (not shown) are located in the second housing part 67 and allow the rotation of the measuring head 61 about the first rotating axis 19.

Figure 6:
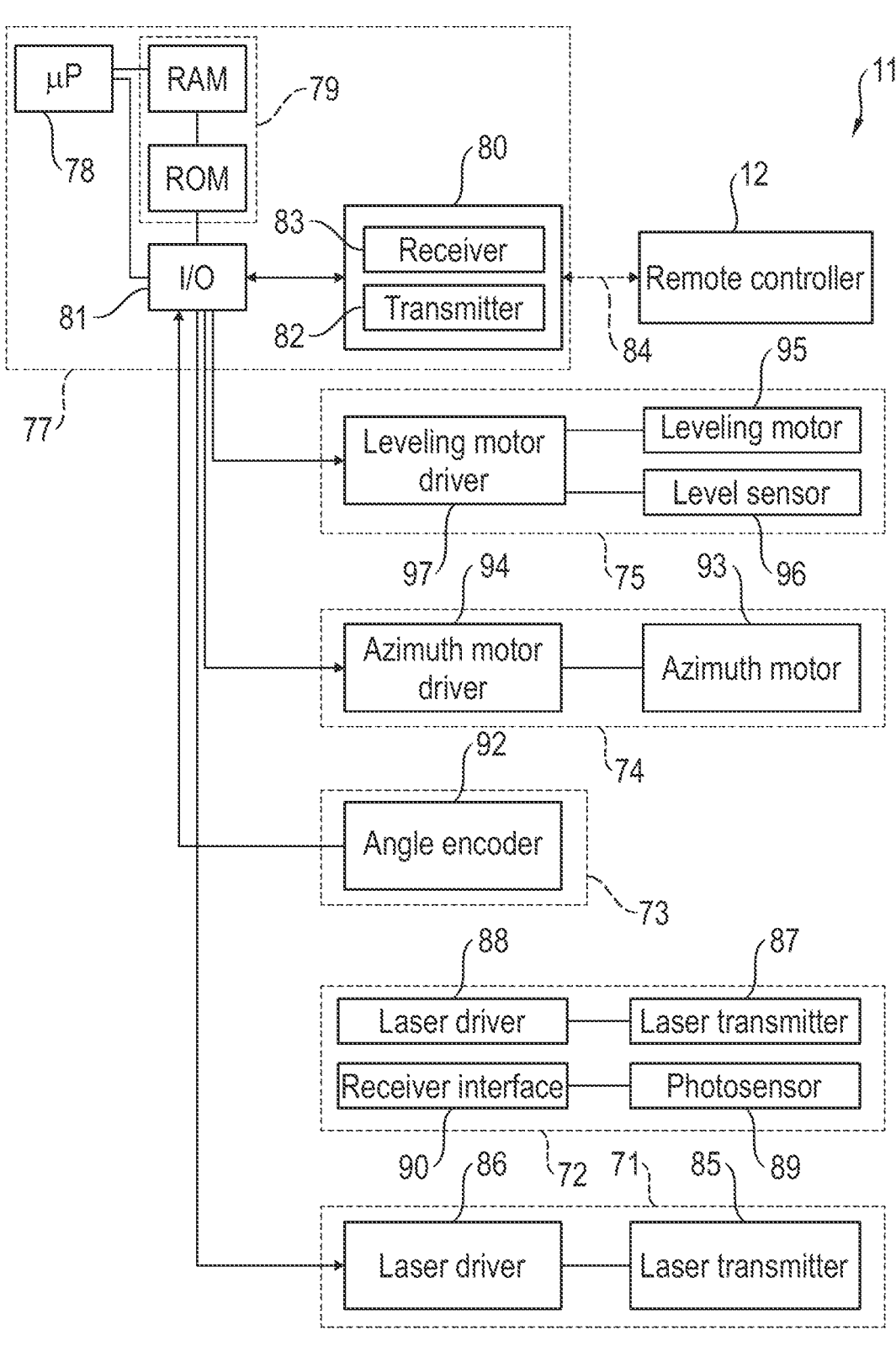
FIG. 6 is a block diagram of the main components of the laser controller as illustrated in FIG. 5 and used in the layout and point transfer system of FIG. 1.

FIG. 6 shows a block diagram of the main components of the laser controller 11 used in the layout and point transfer system 10 illustrated in FIG. 1. The laser controller 11 includes a laser transmitting device 71, a distance measuring device 72, an angle measuring device 73, an azimuth motor device 74, a leveling motor device 75, and a first electronic device 77. The laser transmitting device 71 and distance measuring device 72 will be part of the measuring head 61, which is driven about the first rotating axis 19 by the azimuth motor device 74; the angle measuring device 73, azimuth motor device 74, and leveling motor device 75 will be part of the rotating and leveling device 62.

The first electronic device 77 comprises a first processing circuit 78, a first memory circuit 79, a first communications circuit 80, and a first input/output (I/O) interface circuit 81. The first memory circuit 79 includes associated random-access memory (RAM) and read only memory (ROM). The first processing circuit 78 can communicate with the first memory circuit 79 and the first communications circuit 80 by use of a bus, which typically is referred to as an address bus or as a data bus, and can also contain other types of signals, such as interrupts and perhaps other types of timing signals.

The first input/output interface circuit 81 is an interface between the first processing circuit 78 and various types of motor drive circuits and sensor circuits. The first input/output interface circuit 81 will be in communication with the first communications circuit 80 which includes a first transmitter circuit 82 and first receiver circuit 83. The first communications circuit 80 is designed to communicate and to exchange data information with the remote controller 12, typically using a wireless signal via a communication link 84. In the layout and point transfer system 10, the laser controller 11 will communicate distance information and azimuth angle information with the remote controller 12, and that information arrives via the communication link 84 to and from the first communications circuit 80. In a preferred mode of the layout and point transfer system 10, the communication link 84 will be wireless, although a cable could be connected between the first communications circuit 80 and the remote controller 12.

The laser transmitting device 71 includes a laser transmitter 85 that emits the vertical planar beam 18 of visible laser light and a laser driver circuit 86. The laser driver circuit 86 provides current and voltage to drive the laser transmitter 85 which typically will be a laser diode, although it could be any other type of laser transmitter. The laser transmitter 85 will be emitting a visible wavelength since the laser line on the jobsite surface should be visible for the user. In the laser controller 11 illustrated in FIG. 6, the laser driver circuit 86 is controlled by the first processing circuit 78.

The laser transmitter 85 will typically be a fan beam laser transmitter. However, it will be understood that other types of laser transmitters could be used, including a rotating or scanning laser beam. There must be a minimum amount of divergence to create a laser plane so that the laser beam will at least intersect the floor of a jobsite surface, and perhaps also intersect a ceiling for interior spaces. The laser controller 11 will have many uses, even if the laser transmitter only is pointing at a floor. In this description, it will be assumed that the laser emitter 85 is a fan beam laser transmitter or an equivalent, so that either a continuous vertical planar beam of laser light is being emitted by laser controller 11, or a moving beam of visible laser light is emitted by laser controller 11 in a manner so as to create a plane of laser light that emulates a planar beam.

The distance measuring device 82 includes a laser transmitter 87, a laser driver circuit 88, a photosensor 89, and a laser receiver interface circuit 90. The laser driver circuit 88 provides current for the laser transmitter 87 which emits the narrow measuring beam 21. The photosensor 89 receives at least a part of the measuring beam 21 reflected at the front area 36 of the reflective target 31, and the current signal that is outputted by the photosensor 89 is directed to the laser receiver interface circuit 90. After appropriate amplification and demodulation, the signal is sent via the first input/output interface circuit 81 to the first processing circuit 78.

The angle measuring device 83 includes an angle encoder 91, which will provide input signals to the first processing circuit 78, so that it knows exactly in which azimuth angle the laser transmitter 87 is arranged in a horizontal plane with respect to a zero angle. The output signal of the angle encoder 91 is directed to the first input/output interface circuit 81.

The azimuth motor device 84 includes an azimuth motor 93 and an azimuth motor driver circuit 94. The azimuth motor driver circuit 94 will provide the proper current and voltage to drive the azimuth motor 93, which is the motive force to aim the laser controller 11. This could be part of a self-contained system, working with the angle measuring device 83. However, in FIG. 6, the azimuth motor device 84 is illustrated as being controlled by the first processing circuit 78, which is necessary to perform the functions that are specified in the logic flow charts.

The leveling motor device 85 includes a leveling motor 95, a leveling sensor 96, and a leveling motor driver circuit 97. The leveling motor driver circuit 97 will provide the proper current and voltage to drive the leveling motor 95. In addition, it receives signals form the leveling sensor 96, and these input signals will determine what types of commands will be sent to the leveling motor 95 from the leveling motor driver circuit 97. If desired, the leveling motor device 85 can be a self-contained system that may not need to communicate with the first processing circuit 78. However, the laser controller 11 will typically desire knowledge of whether or not the laser controller 11 has actually finished its leveling function before the laser controller 11 begins to work in its normal mode of operation. In FIG. 6, the leveling motor device 85 is illustrated as being controlled by the first processing circuit 78.

Figure 7A:
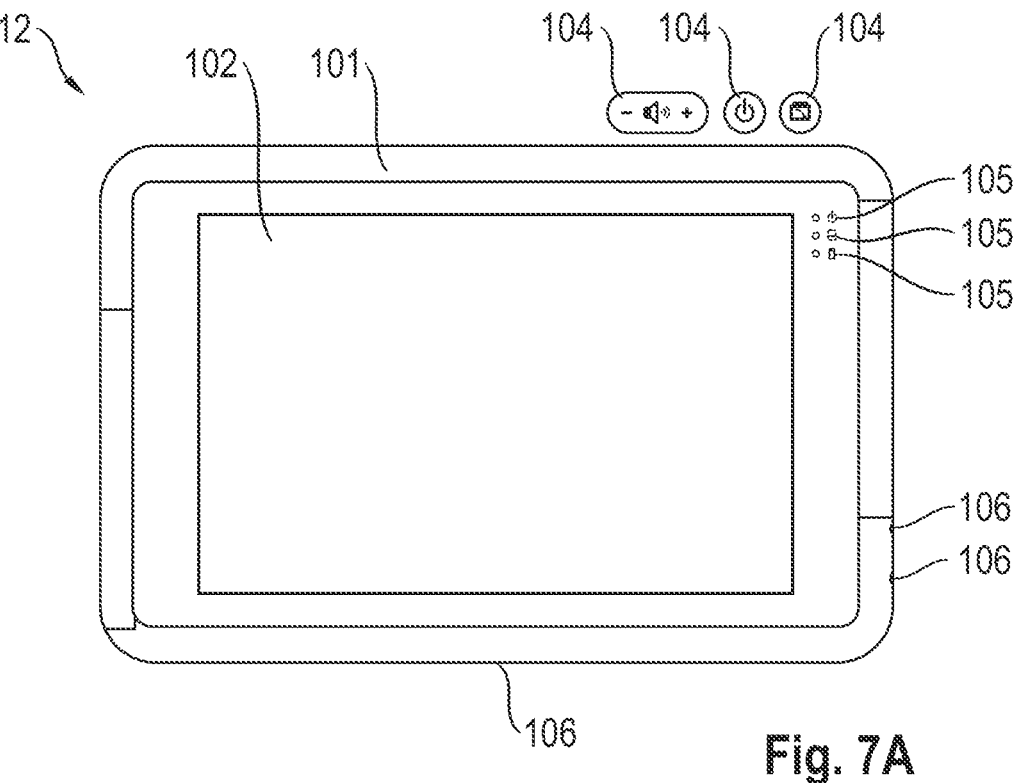
FIGS. 7A, B show an exemplary version of the remote controller of the layout and point transfer system of FIG. 1 in a top view on a front side (FIG. 7A) and in a top view on a rear side (FIG. 7B) of the remote controller.
Figure 7B:
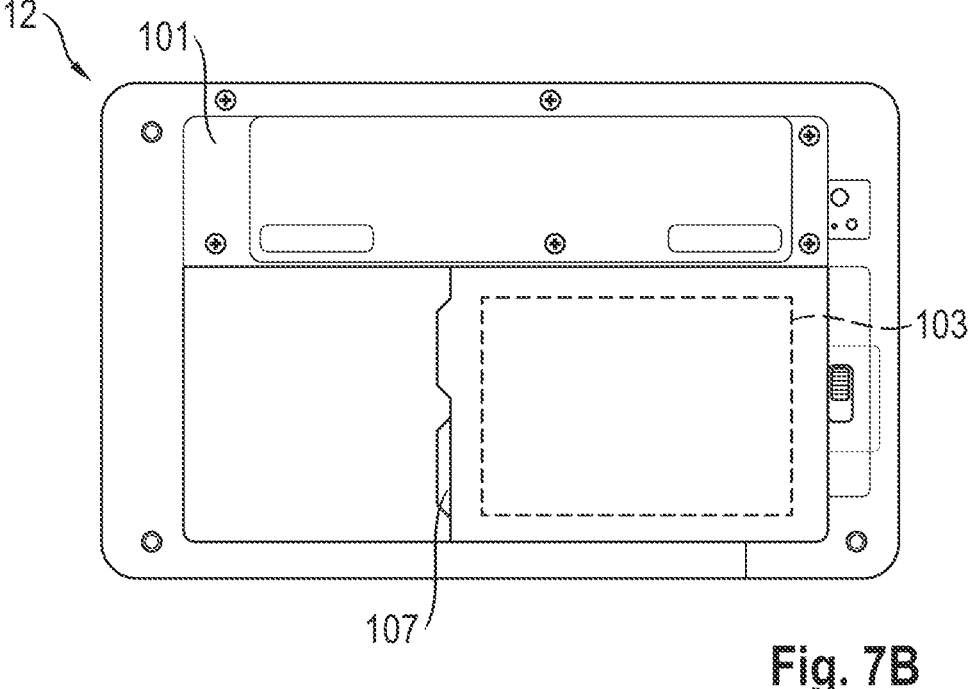

FIGS. 7A, B show an exemplary version of the remote controller 12 in a top view on a front side (FIG. 7A) and in a top view on a rear side (FIG. 7B) of the remote controller 12. The remote controller 12 is designed as tablet computer and includes a housing 101, a touch screen display 102, a battery 103, a set of buttons 104, e.g., volume control button, power on/off button, and display control button, a set of indicators 105, e.g., for operating status, data storage status, and battery status, a set of connectors 106, e.g., for docking, data storage, and USB, and a card slot 107.

Figure 8:
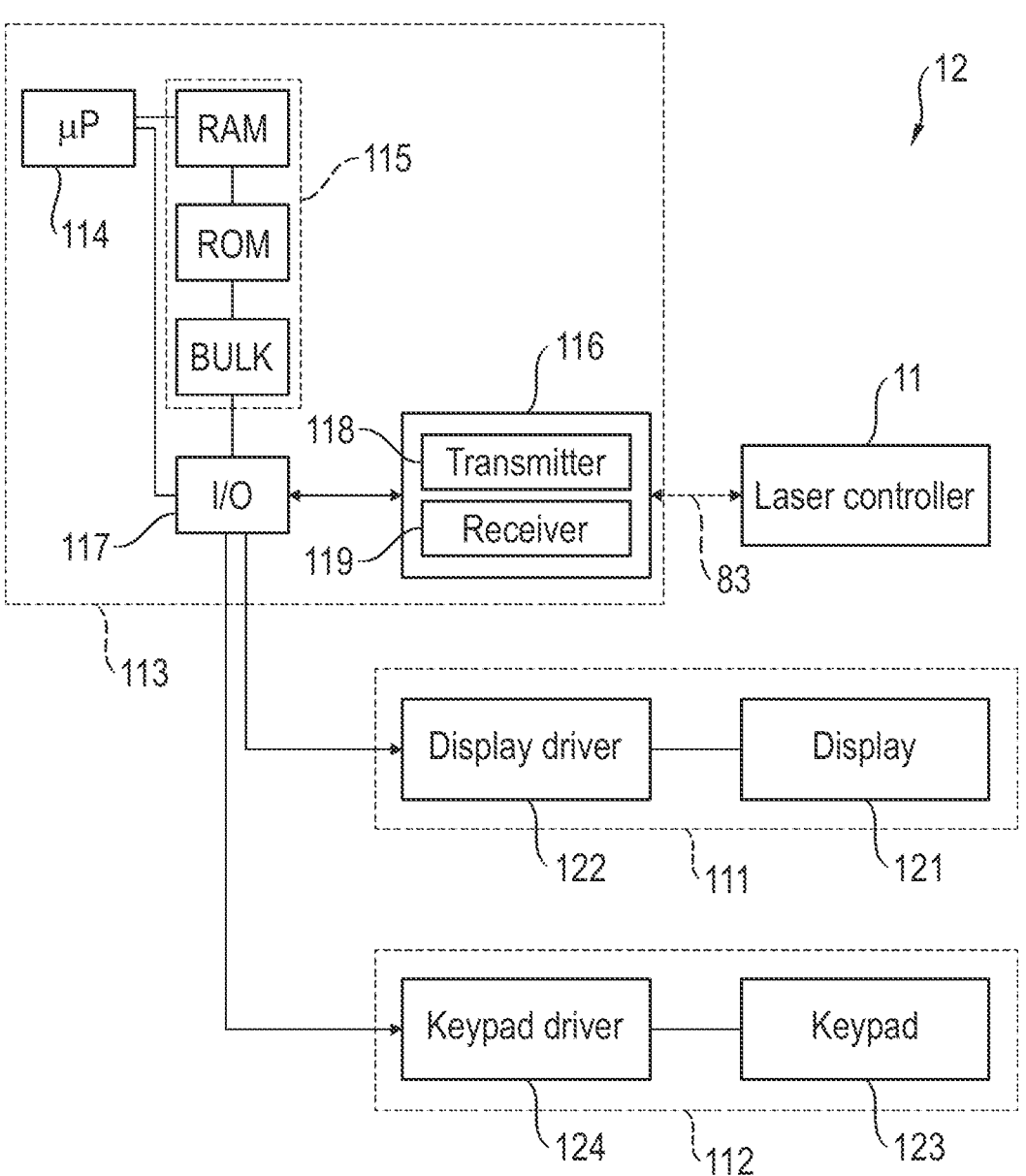
FIG. 8 is a block diagram of the main components of the remote controller as illustrated in FIGS. 7A, B and used in the layout and point transfer system of FIG. 1.

FIG. 8 shows a block diagram of the remote controller 12 used in the layout and point transfer system 10 illustrated in FIG. 1. The remote controller 12 includes a display device 111, a user-operated input device 112, and a second electronic device 113, which comprises a second processing circuit 114, a second memory circuit 115, a second communications circuit 116, and a second input/output (I/O) interface circuit 117.

The second memory circuit 115 includes associated random-access memory (RAM), read only memory (ROM), and some type of bulk memory (BULK); the bulk memory could be a SD card that can plug in the card slot 107 or an external memory device that can plug into the remote controller 12 via one of the connectors 106, e.g., a USB connector. The second processing circuit 114 will communicate with the second memory circuit 115 and the second communications circuit 16 by use of a bus, which would normally carry data signals or address signals, and other types of microprocessor signals, such as interrupts.

The second I/O interface circuit 117 will be in communication with the second communications circuit 116, which includes a second transmitter circuit 118 and a second receiver circuit 119. The second communications circuit 116 is designed to communicate with the laser controller 11, typically using a wireless signal via the communication link 84. In the layout and point transfer system 10, the laser controller 11 will communicate distance information and azimuth angle information with the remote controller 12, and that information arrives via the communication link 84 to and from the second communications circuit 116.

The display device 111 includes a display 121 and a display driver circuit 122. The display driver circuit 122 will be in communication with the second I/O interface circuit 117 and provides the correct interface and data signals for the display 121. If the remote controller 12 is a laptop computer, for example, then this would be the standard display seen in most laptop computers. Or, if the remote controller 12 is a tablet computer or a smart phone, in which case the display device is a much smaller physical device, the display device 111 could be a touch screen display.

The user-operated input device 112 includes a keypad 123 and a keypad driver circuit 124. The keypad driver circuit 124 will be in communication with the second I/O interface circuit 117 and controls the signals that interface to the keypad 123. If the display device 111 is a touch screen display, then there may not be a separate keypad on the remote controller 12, because most of the command or data to input functions will be available by touching the display itself and the keypad is integrated in the touch screen display. There may be some type of power on/off button, but that would not necessarily be considered a true keypad and typically would not be used for entering data.

Figure 9A:
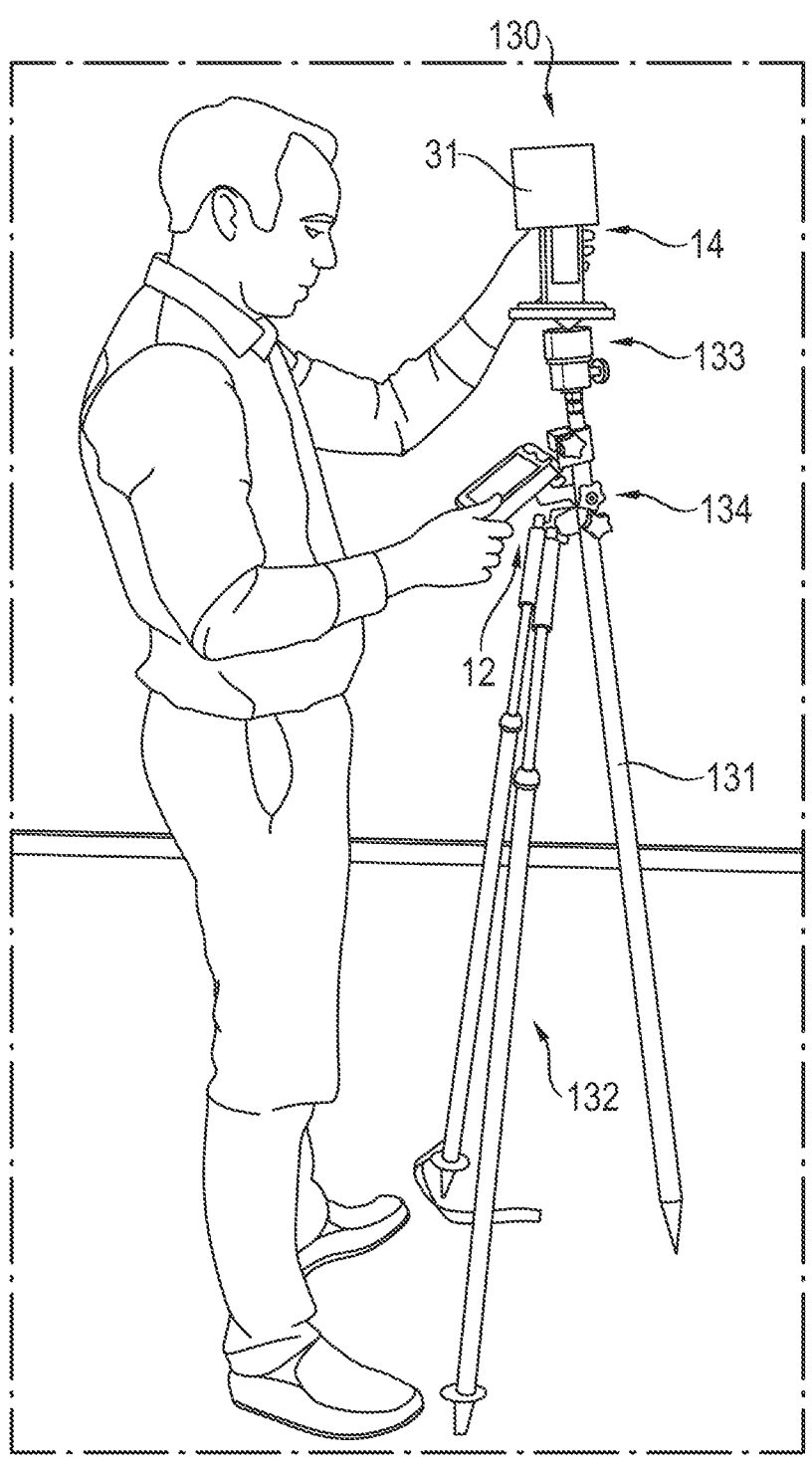
FIGS. 9A, B show a second embodiment of a layout accessory including the target and plumbing system of FIG. 1, a pole, a bipod device, and a connecting unit.

FIG. 9A shows a second embodiment of a layout accessory 130 that is adapted for layouting points of interest on the floor 17 and/or on the ceiling 30. The layout accessory 130 can be used in the layout and point transfer system 10 of FIG. 1A and substitute the layout accessory 13.

The layout accessory 130 includes the target and plumbing system 14 of FIG. 1, a pole 131, a bipod device 132, and a connecting unit 133 that is designed to connect the target and plumbing system 14 to the pole 131. The target and plumbing system 14 is connected via the connecting unit 133 to the pole 131 and the bipod device 132 is mounted to the pole 131. The pole 131 and bipod device 132 are designed as portable chassis 134 for the target and plumbing system 14. The bipod device 132 is used to arrange the layout accessory 130 in a stable and substantially leveled position.

The pole 131 is arranged in an inclined position with the bipod device 132 attached to the inclined pole 131. The orientation of the target and plumbing system 14 can be adjusted via the connecting unit 133, which can include a spherical head allowing that the target and plumbing system 14 is substantially level. The remote controller 12 may be attached to the pole 131 via a bracket element 135, which is preferably attached to the pole 131 at a height such that the user can handle the target and plumbing system 14 and check the display 121 of the remote controller 12.

Figure 9B:
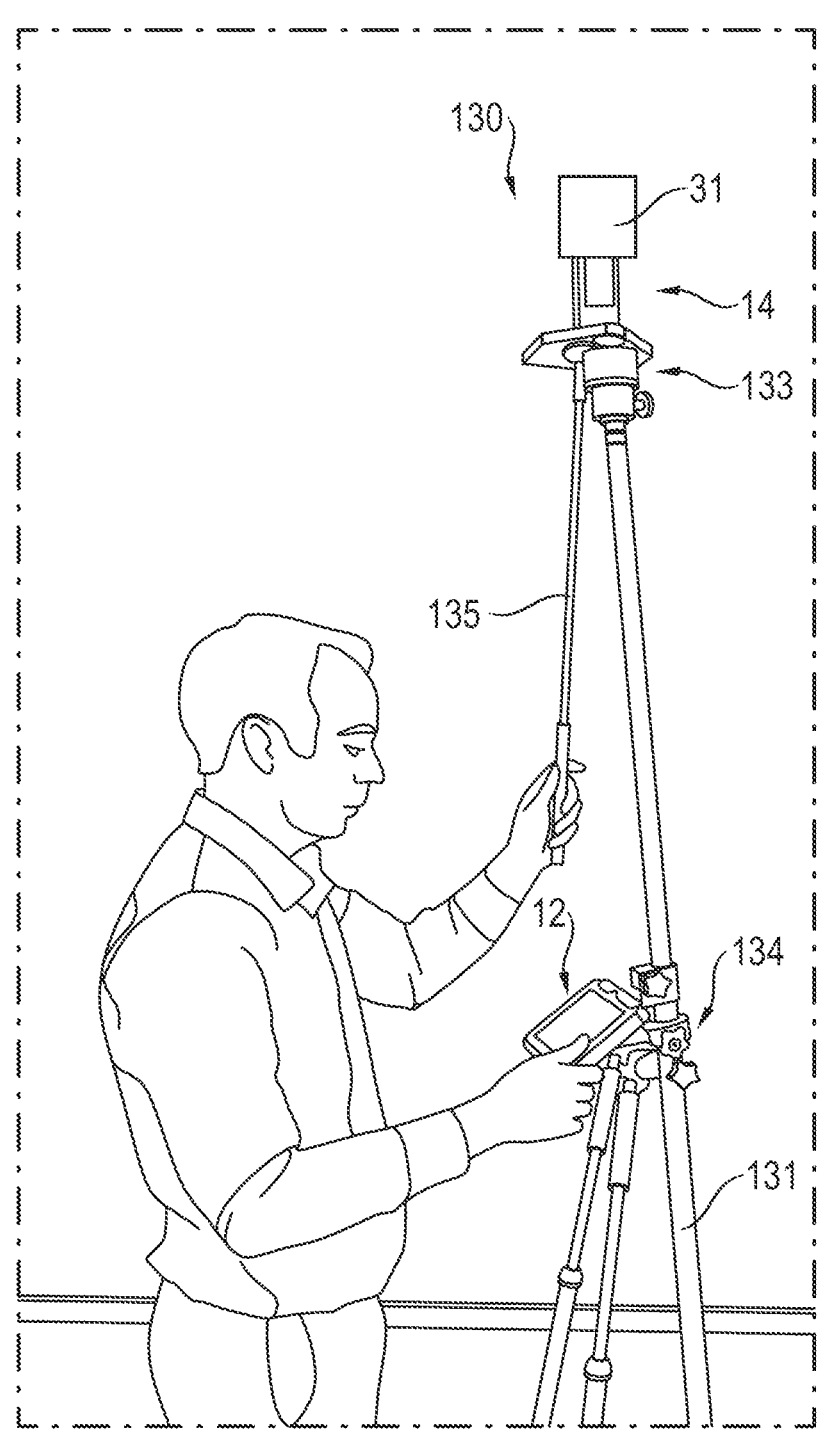

FIG. 9B shows the layout accessory 130 of FIG. 9A adapted for layouting points of interest on high ceiling surfaces. To layout points of interest on high ceiling surfaces, the pole 131 is extended to its maximum length. In the extended position of the pole 131, the target and plumbing system 14 is no longer operable by the user. To operate the target and plumbing system 14, the positioning device 34 may be connected to an operating element 136 that can be operated by the user.

The operating element 136 allows to arrange the target and plumbing system 14 in a height such that a line-of-sight between the laser controller 11 and the reflective target 31 may not be interrupted by material and/or tools stored on the jobsite or by users working on the jobsite; the distance measuring can be performed with high accuracy.

Figure 10:
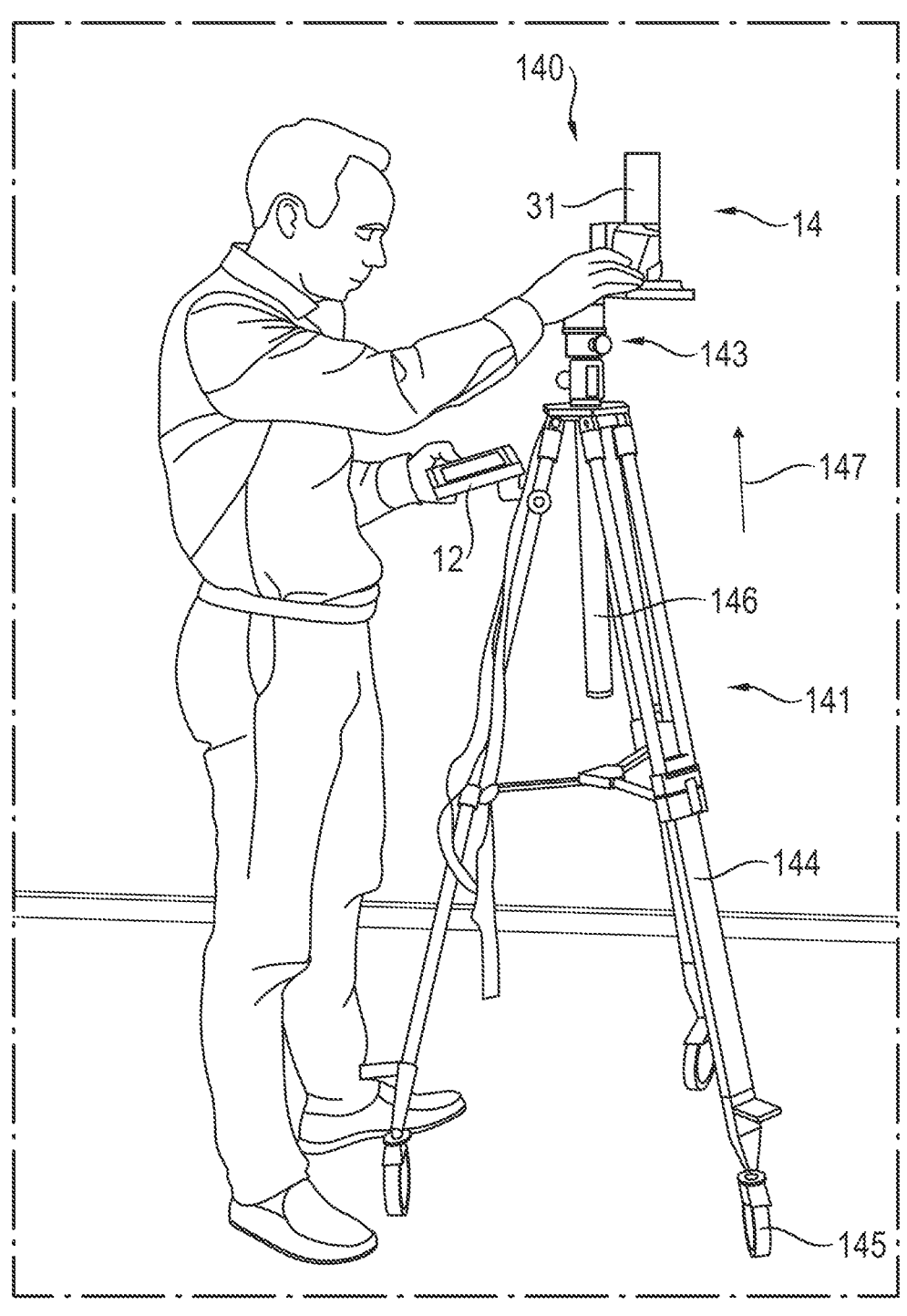
FIG. 10 shows a third embodiment of a layout accessory including the target and plumbing system of FIG. 1, a tripod device, and a connecting unit.

FIG. 10 shows a third embodiment of a layout accessory 140 that is adapted for layouting points of interest on the floor 17 and/or on the ceiling 30. The layout accessory 140 can be used in the layout and point transfer system 10 of FIG. 1A and substitute the layout accessory 13.

The layout accessory 140 includes the target and plumbing system 14, a tripod device 141, and a connecting unit 143. The tripod device 141 is designed as movable chassis for the target and plumbing system 14 and includes three legs 144, which may be adjusted in length, three wheels 145, which allow to move the layout accessory 140 over the floor 17, and a central rod 146, which may be adjusted along a height direction 147. The target and plumbing system 14 is placed via the tripod device 141 at whatever height is needed dependent on the conditions of the jobsite between a minimum position and a maximum position.

In FIG. 10, the central rod 146 is arranged in its lowest position with respect to a head of the tripod device 141. After the layout accessory 140 has been positioned near the point of interest, the user does the fine adjusting by means of the holding device 34 or the housing of the plumb line laser pointer 32.

To layout points of interest on high ceiling surfaces, the central rod 146 can be extended to its maximum length with respect to the head of the tripod device 141. In the extended position of the central rod 146, the target and plumbing system 14 is no longer operable by the user. To operate the target and plumbing system 14, the positioning device 35 of the target and plumbing system 14 can be connected to an operating element that can be operated by the user.

Figure 11:
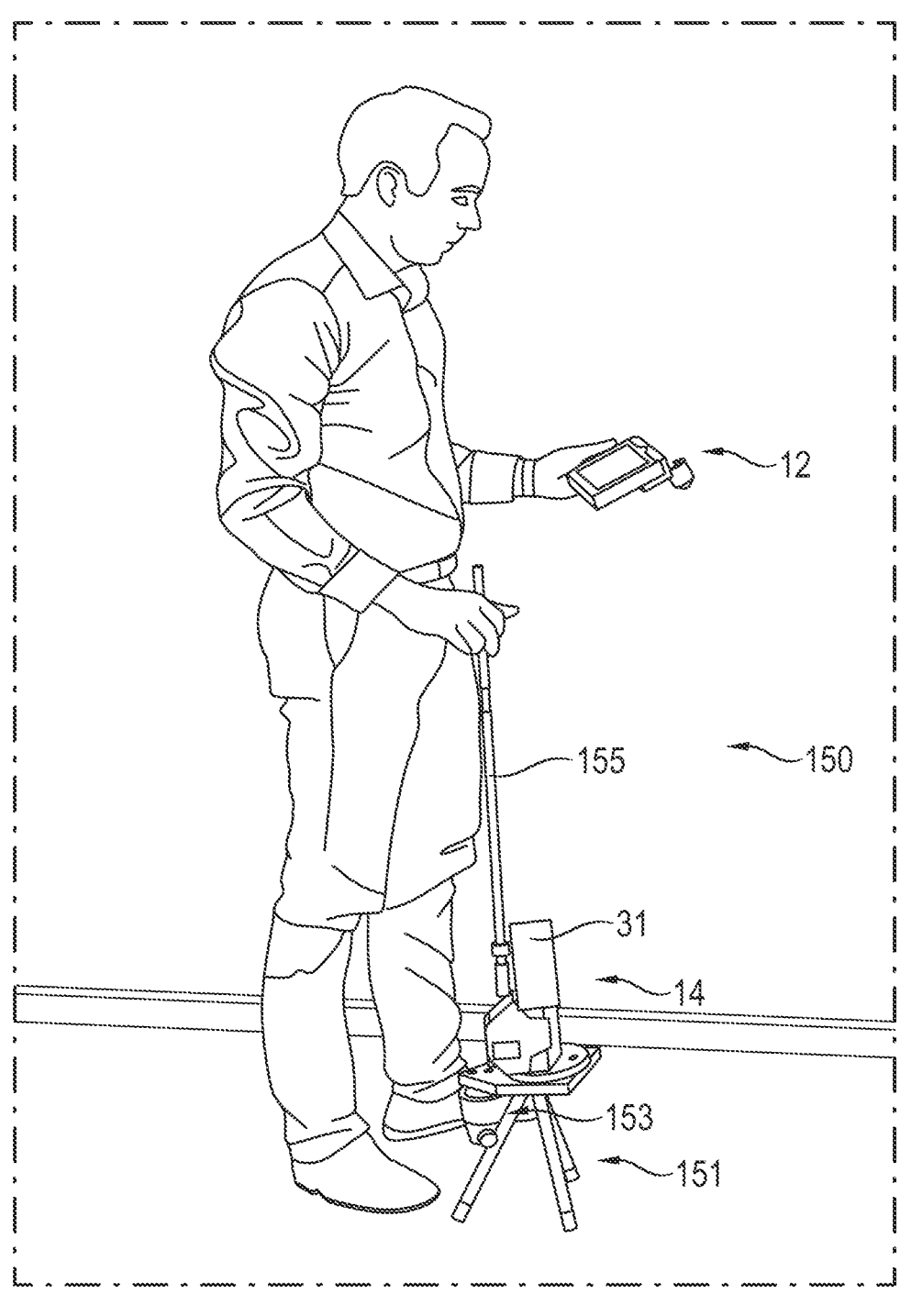
FIG. 11 shows a fourth embodiment of a layout accessory including the target and plumbing system of FIG. 1, a mini tripod device, and a connecting unit.

FIG. 11 shows a fourth embodiment of a layout accessory 150 that is adapted for layouting points of interest on a floor. The layout accessory 150 can be used in the layout and point transfer system 10 of FIG. 1A and substitute the layout accessory 13.

The layout accessory 150 includes the target and plumbing system 14, a mini tripod device 151, and a connecting unit 153 that allows to connect the target and plumbing system 14 to the mini tripod device 151. The mini tripod device 151 is designed as portable chassis for the target and plumbing system 14.

Compared to chassis such as the tripod device 15, the mini tripod device 151 has a light and compact design and is easy to handle and to transport. Furthermore, the mini tripod device 151 is advantageous during layouting on moving working floors, e.g., metal deck. Arranging the target and plumbing system 14 closer to the floor 17 is preferred when the working floor is moving (e.g., metal deck) because to the same angular swing the opposite length (swinging projection of the floor) is directly proportional to the adjacent length (height of the pivot to the floor).

To improve the handling of the mini tripod device 151, the target and plumbing system 14 is connected to an operating element 154. To layout a point of interest, the user carries the layout accessory 150 by the operating element 154. He moves the layout accessory 150 along the vertical planar beam 18 of visible laser light until the deviation between the position of the target and plumbing system 14 and the point of interest is smaller than the predetermined first limit. The user stops the movement of the layout accessory 150 and arranges it in a stable and substantially leveled position. While monitoring the display 121 of the remote controller 12, the user moves the reflective target 31 and the plumb line laser pointer 32 by the operating element 154 relative to the platform 46 until the vertical planar beam 18 crosses the aiming area 37 of the reflective target 31 and until the deviation between the position of the target and plumbing system 14 and the point of interest is zero or at least smaller than the predetermined second limit.

Figure 12:
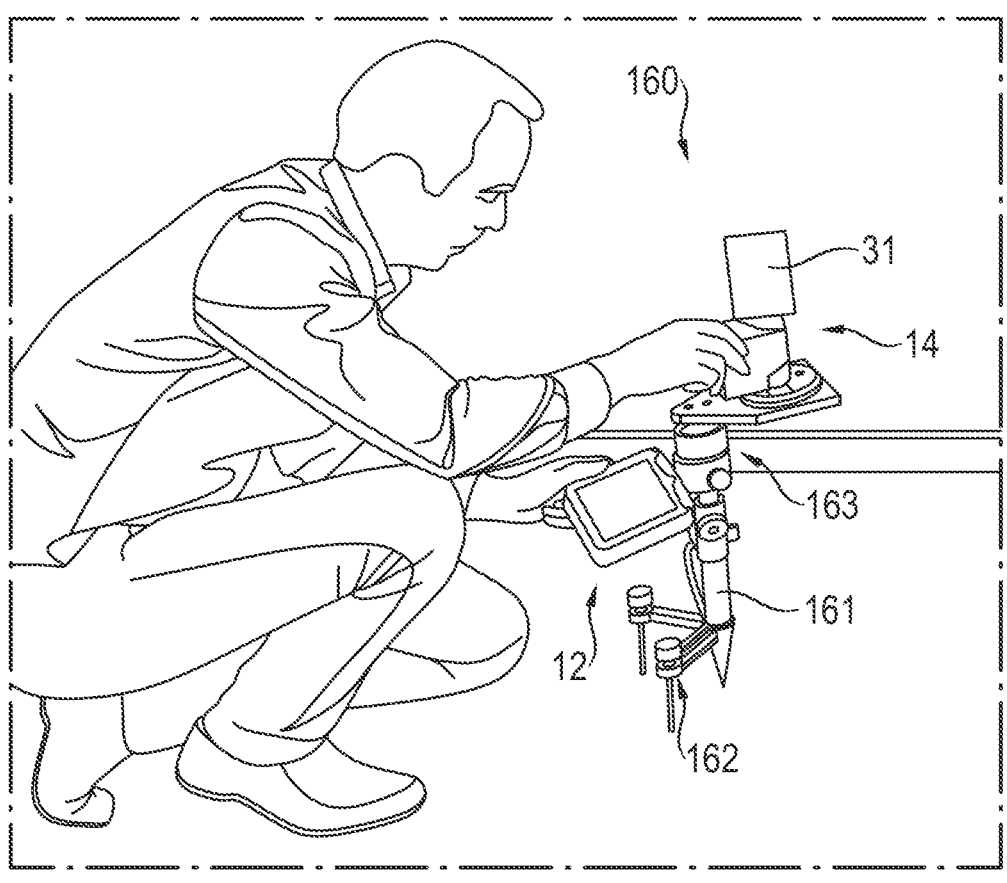
FIG. 12 shows a fifth embodiment of a layout accessory including the target and plumbing system of FIG. 1, a mini pole, a mini bipod device, and a connecting unit.

FIG. 12 shows a fifth embodiment of a layout accessory 160 that is adapted for layouting points of interest on the floor 17. The layout accessory 160 can be used in the layout and point transfer system 10 of FIG. 1A and substitute the layout accessory 13.

The layout accessory 160 includes the target and plumbing system 14, a mini pole 161, a mini bipod device 162, and a connecting unit 163 that allows to connect the target and plumbing system 14 to the mini pole 161. The mini pole 161 and mini bipod device 162 are designed as portable chassis 164 for the target and plumbing system 14. The remote controller 12 may be attached to the mini pole 161 via a bracket element 164, which allows the user to handle the target and plumbing system 14 and to check the display 121 of the remote controller 12.

Figure 13:
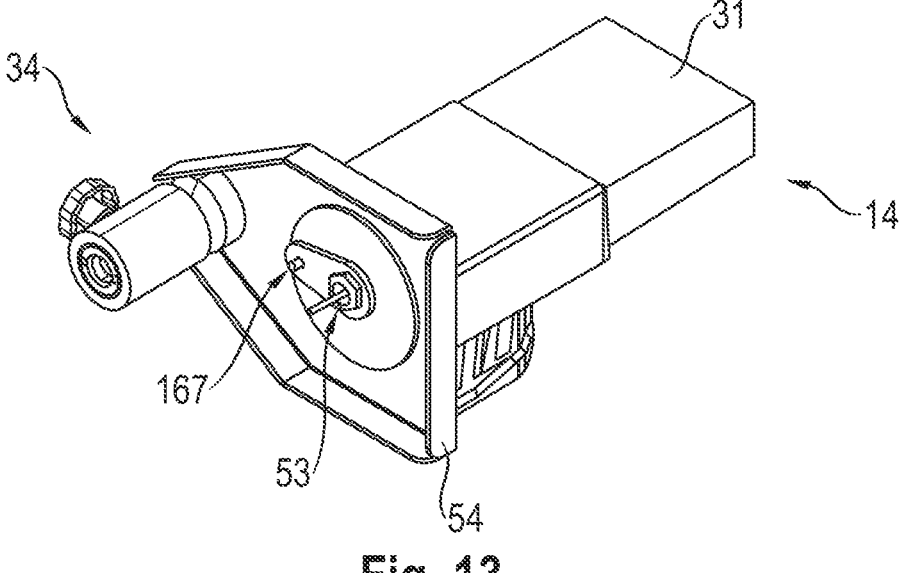
FIG. 13 shows the target and plumbing system of FIG. 1 in a preferred embodiment with a connecting unit to connect the target and plumbing system to a chassis and a modified connecting means to connect an operating element to the target and plumbing system.
Figure 14:
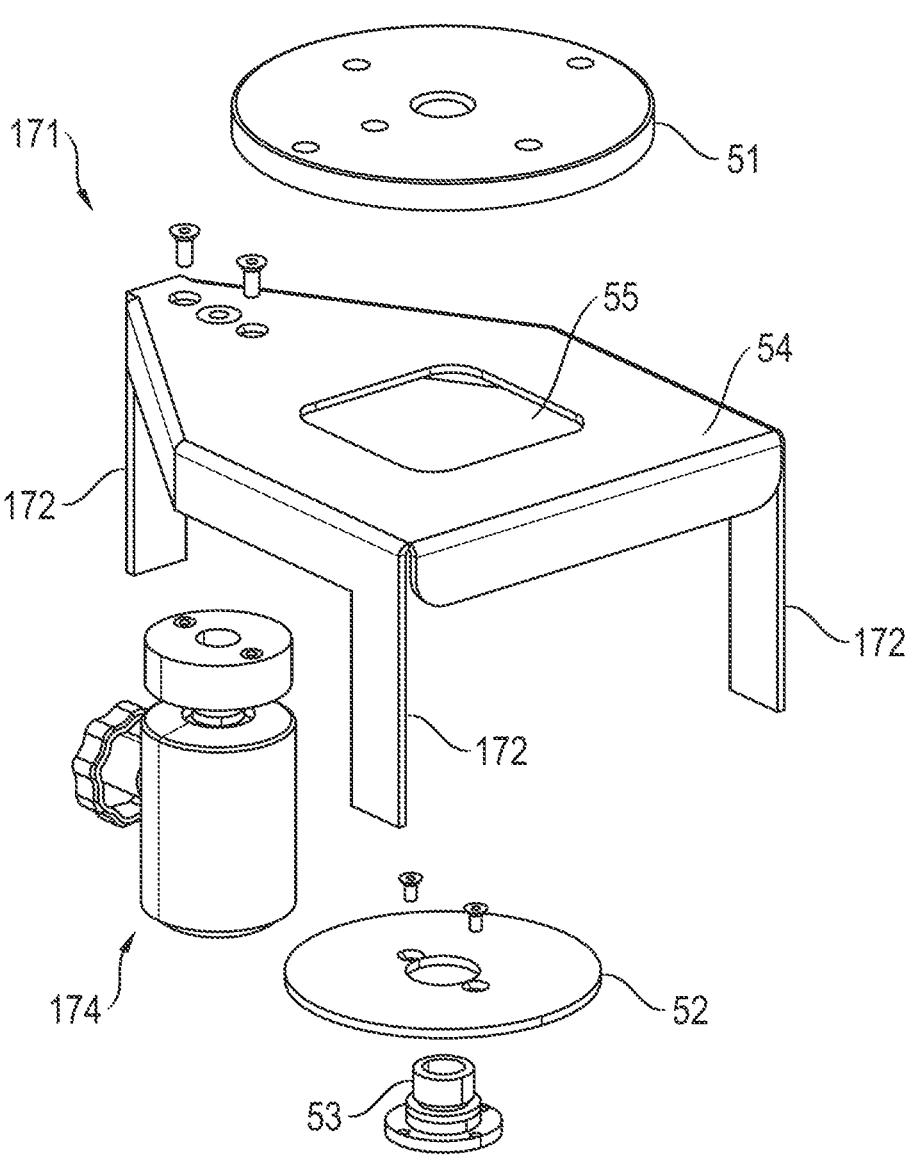
FIG. 14 shows an alternative portable chassis for the target and plumbing system of FIG. 1.

FIG. 13 shows a detail of the target and plumbing system 14. The operating elements 136, 154 must be connected to the mobile unit 50 to allow movement of the mobile unit 50 with respect to the platform 46. FIG. 14 shows a possible design to connect the operating elements 136, 154 to the mobile unit 50. The washer 45B of the connecting means 45 includes an interface 167 which allows to connect the operating element 136 to the first positioning element 41. Alternatively, the operating elements 136, 154 may be connected to the holding device 33 or any other suitable component of the mobile unit 50.

FIG. 14 shows an alternative portable chassis 171 that may substitute the portable chassis 151 of FIG. 11 or the portable chassis 164 of FIG. 12. The portable chassis 171 includes three legs 172 that are integrated with the platform 54 in an integrated compartment 173, which may be fabricated from metal or any other suitable material.

To increase the range of applications the platform 54 may be connected to a connecting unit 174 that may be identical to the connecting unit 27. The connecting unit 174 may include a standard interface, e.g., ⅝ inches thread, to connect the target and plumbing system 14 to a wide range of movable and/or portable chassis.

The invention claimed is:

1. A target and plumbing system (14), comprising:
    a reflective target (31) which includes a reflective planar front area (36) having an aiming area (37), wherein the aiming area (37) is smaller than the reflective planar front area (36), and a rear area (39);
    a self-leveling plumb line laser pointer (32) which emits a plumb line laser beam (41) having a pathway that is in a vertical direction (42), wherein the vertical direction (42) is substantially parallel to a gravitational direction (20);
    a holding device (33) which includes a first holding element (43) that assists in holding the reflective target (31) in a defined position when the reflective target (31) is in use and a second holding element (44); and
    a positioning device (34) which includes a first positioning element (48) and a second positioning element (49), wherein the holding device (33) is connected to the positioning device (34), the self-leveling plumb line laser pointer (32) is connected to the first positioning element (48), and the first positioning element (48) is movable with respect to the second positioning element (49);

wherein the holding device (33) is connected to the first positioning element (48), wherein the second positioning element (49) is a platform (54) including an open space (55) that defines a horizontal two-dimensional area, and wherein the first positioning element (48) is movable with respect to the open space (55).

2. The target and plumbing system (14) of claim 1, wherein the first positioning element (48) includes an upper plate element (51), a lower plate element (52), and a connector (53) that connect the upper plate element (51) and lower plate element (52) and wherein the upper plate element (51) is disposed next to a top side (56A) of the platform (54), the lower plate element (52) is disposed next to a bottom side (56B) of the platform (54) and the connector (53) is disposed at least partially inside the open space (55).

3. The target and plumbing system (14) of claim 1, wherein the first positioning element (48) is rotatable about a rotating axis (58) with respect to the second positioning element (49) and wherein the rotating axis (58) is substantially parallel to the gravitational direction (20).

4. The target and plumbing system (14) of claim 1, wherein the front area (36) of the reflective target (31) is oriented substantially coplanar to the gravitational direction (20) and the second holding element (44) assists in holding the self-leveling plumb line laser pointer (32) in a position such that the plumb line laser beam (41) is coincident with the front area (36) when the reflective target (31) is in use.

5. The target and plumbing system (14) of claim 1, wherein the reflective target (31) is shiftable between a first position (46) and a second position (47) that is different from the first position (46), wherein in the first position (46) the front area (36) is coincident with the plumb line laser beam (41), and wherein in the second position (47) the front area (36) is not coincident with the plumb line laser beam (41).

6. The target and plumbing system (14) of claim 5, wherein the reflective target (31) is pivotable about a pivoting axis (45) between the first position (46) and the second position (47).

7. The target and plumbing system (14) of claim 6, wherein, in the second position (45), the front area (36) is oriented substantially perpendicular to the gravitational direction (20).

8. The target and plumbing system (14) of claim 5, wherein the reflective target (31) includes a blocking element (38) that is disposed in the pathway of the plumb line laser beam (41) when the reflective target (31) is in use.

9. The target and plumbing system (14) of claim 1, further comprising a connecting unit (27; 133; 143; 153; 163; 174) which is connected to the second positioning element (49) and is connectable to a movable and/or portable chassis (15; 132; 141; 151; 162; 171).

10. A movable and/or portable layout accessory (13; 130; 140; 150; 160), comprising:
    the target and plumbing system (14) as claimed in claim 1; and
    a movable and/or portable chassis (15; 132; 141; 151; 162; 171).

11. The movable and/or portable layout accessory (13; 130; 140; 150; 160) of claim 10, wherein the target and plumbing system (14) is connected to an operating element (136; 154).

12. The movable and/or portable layout accessory (13; 130; 140; 150; 160) of claim 1, wherein the target and plumbing system (14) is mounted to an extension arm (16).

13. A layout and point transfer system (10) to find a predetermined point of interest (POI), comprising:

a laser controller (11) including: (i) a laser transmitting device (71) that emits a vertical planar beam (18) of visible laser light, wherein the vertical planar beam (18) is substantially perpendicular to a gravitational direction (20) and is rotatable about a first rotating axis (19); (ii) a distance measuring device (72) that emits a measuring beam (21) and measures a distance, wherein the distance measuring device (72) is rotatable about the first rotating axis (19); (iii) an angle measuring device (73) that measures an azimuth angle of the laser transmitting device (71) in a horizontal plane with respect to a zero angle, wherein the horizontal plane is substantially perpendicular to the gravitational direction (20); and (iv) a first processing circuit (78), a first memory circuit (79) including instructions executable by the first processing circuit (78), a first communications circuit (80), and a first input/output interface circuit (81);

a remote controller (12) including: (i) a display device (111); (ii) a user-operated input circuit (112); and (iii) a second processing circuit (114), a second memory circuit (115) including instructions executable by the second processing circuit (114), a second communications circuit (116), and a second input/output interface circuit (117), wherein the laser controller (11) and the remote controller (12) communicate with one another by use of the first communications circuit (78) and second communications circuit (116); and the target and plumbing system (14) as claimed in claim 1, the target and plumbing system (14) further comprising a movable unit (50) including the reflective target (31), the self-leveling plumb line laser pointer (32), the holding device (33), and the first positioning element (41), wherein the movable unit (50) is movable with respect to the second positioning element (42) and wherein the reflective target (31) is disposed in a first position (46);

wherein the first and second processing circuits (78; 116) are configured to:

using the laser transmitting device (71), emit the substantially vertical planar beam (18), and using the distance measuring device (72), emit the measuring beam (21);

using the angle measuring device (73), aim the vertical planar beam (18) and the measuring beam (21) in a predetermined azimuth angle such that the vertical planar beam (18) and the measuring beam (21) cross the point of interest (POI);

move the target and plumbing system (14) until the vertical planar beam (18) and the measuring beam (21) cross the front area (36) of the reflective target (31);

using the distance measuring device (72), measure a distance between the distance measuring device (72) and the target and plumbing system (14) as the target and plumbing system (14) is moved along the vertical planar beam (18) and the measuring beam (21);

using the remote controller (12) and/or the laser controller (11), calculate a deviation (d) between the measured distance and a distance between the point of interest (POI) and the laser controller (11);

using the remote controller (12) and/or the laser controller (11), output a visible and/or audible indication that corresponds to the deviation (d);

while monitoring the visible and/or audible indication, move the target and plumbing system (14) along the vertical planar beam (18) and the measuring beam (21) until the deviation (d) is smaller than a predetermined first limit ($D_1$);

stop a movement of the target and plumbing system (14) along the vertical planar beam (18) and the measuring beam (21) and arrange the target and plumbing system (14) in a stable and substantially leveled position;

while monitoring the visible and/or audible indication, move the reflective target (31) relative to the second positioning element (48) until the vertical planar beam (18) and the measuring beam (21) cross the aiming area (37) and until the deviation (d) is zero or at least smaller than a predetermined second limit ($D_2$), wherein the second limit ($D_2$) is smaller than the first limit ($D_1$).

14. The layout and point transfer system (10) of claim 13, wherein the first and second processing circuits (78; 114) are configured to, using the self-leveling plumb line laser pointer (32), emit the plumb line laser beam (48) and generate a lower plumb point (28) on a floor (17) of a jobsite and/or an upper plumb point (29) on a ceiling (30) of the jobsite.

15. A method for layouting and transferring a point of interest (POI), comprising the steps of:

providing a laser controller (11) which includes: (i) a laser transmitting device (71) that emits a vertical planar beam (18) of visible laser light, wherein the vertical planar beam (18) is substantially perpendicular to a gravitational direction (20) and is rotatable about a first rotating axis (19); (ii) a distance measuring device (72) that emits a measuring beam (21) and measures a distance, wherein the distance measuring device (72) is rotatable about the first rotating axis (19); (iii) an angle measuring device (73) that measures an azimuth angle of the laser transmitting device (71) in a horizontal plane with respect to a zero angle, wherein the horizontal plane is substantially perpendicular to the gravitational direction (20); and (iv) a first processing circuit (78), a first memory circuit (79) including instructions executable by the first processing circuit (78), a first communications circuit (80), and a first input/output interface circuit (81);

providing a remote controller (12) which includes: (i) a display device (111); (ii) a user-operated input circuit (112); and (iii) a second processing circuit (114), a second memory circuit (115) including instructions executable by the second processing circuit (114), a second communications circuit (116), and a second input/output interface circuit (117), wherein the laser controller (11) and the remote controller (12) communicate with one another by use of the first communications circuit (78) and second communications circuit (116);

providing the target and plumbing system (14) as claimed in claim 1, the target and plumbing system (14) further comprising a movable unit (50) including the reflective target (31), the self-leveling plumb line laser pointer (32), the holding device (33), and the first positioning element (41), wherein the movable unit (50) is movable with respect to the second positioning element (42) and wherein the reflective target (31) is disposed in a first position (46);

placing the laser controller (11) on a floor (17) of a jobsite in a work area; and finding a predetermined point of interest (POI) by:

using the laser transmitting device (71), emitting the substantially vertical planar beam (18), and using the distance measuring device (72), emitting the measuring beam (21);

using the angle measuring device (73), aiming the vertical planar beam (18) and the measuring beam (21) in a predetermined azimuth angle such that the vertical planar beam (18) and the measuring beam (21) cross the point of interest (POI);

moving the target and plumbing system (14) until the vertical planar beam (18) and the measuring beam (21) cross the front area (36) of the reflective target (31);

using the distance measuring device (72), measuring a distance between the distance measuring device (72) and the target and plumbing system (14), as the target and plumbing system (14) is moved along the vertical planar beam (18) and the measuring beam (21);

using the remote controller (12) and/or the laser controller (11), calculating a deviation (d) between the measured distance and a distance between the point of interest (POI) and the laser controller (11);

using the remote controller (12) and/or the laser controller (11), outputting a visible and/or audible indication that corresponds to the deviation (d);

while monitoring the visible and/or audible indication, moving the target and plumbing system (14) along the vertical planar beam (18) and the measuring beam (21) until the deviation (d) is smaller than a predetermined first limit ($D_1$);

stopping the movement of the target and plumbing system (14) along the vertical planar beam (18) and the measuring beam (21), and arranging the target and plumbing system (14) in a stable and substantially leveled position; and while monitoring the visible and/or audible indication, moving the reflective target (31) relative to the second positioning element (48) until the vertical planar beam (18) and the measuring beam (21) cross the aiming area (37) and until the deviation (d) is zero or at least smaller than a predetermined second limit ($D_2$), wherein the second limit ($D_2$) is smaller than the first limit ($D_1$).

16. The method of claim 15, further comprising the steps of:

using the self-leveling plumb line laser pointer (32), emitting the plumb line laser beam (48) and generating a lower plumb point (28) on the floor (17) of the jobsite; and transferring the lower plumb point (28) onto the floor (17) of the jobsite.

17. The method of claim 15, further comprising the steps of:

arranging the reflective target (31) in the second position (45);

using the self-leveling plumb line laser pointer (32), emitting the plumb line laser beam (48) and generating a lower plumb point (28) on the floor (17) of the jobsite and an upper plumb point (29) on a ceiling (30) of the jobsite; and transferring the lower plumb point (28) and/or the upper plumb point (29) onto the ceiling (30) of the jobsite.

18. The method of claim 15, further comprising the steps of:

using the self-leveling plumb line laser pointer (32), emitting the plumb line laser beam (48) and generating a lower plumb point (28) on the floor (17) of the jobsite;

transferring the lower plumb point (28) onto the floor (17) of the jobsite;

arranging the reflective target (31) in the second position (45);

using the self-leveling plumb line laser pointer (32), emitting the plumb line laser beam (48) and generating an upper plumb point (29) on a ceiling (30) of the jobsite; and transferring the upper plumb point (29) onto the ceiling (30) of the jobsite.

* * * * *